United States Patent [19]
Nilsson et al.

[11] Patent Number: 5,410,703
[45] Date of Patent: Apr. 25, 1995

[54] SYSTEM FOR CHANGING SOFTWARE DURING COMPUTER OPERATION

[75] Inventors: Rickard Nilsson; Ulf Markström, both of Stockholm; Leif Klöfver, Älvsjö, all of Sweden

[73] Assignee: Telefonaktiebolaget L M Ericsson, Stockholm, Sweden

[21] Appl. No.: 907,294

[22] Filed: Jul. 1, 1992

[51] Int. Cl.$^6$ .............................................. G06F 9/445
[52] U.S. Cl. .............................. 395/700; 364/DIG. 1; 364/285.4; 371/19
[58] Field of Search .......................... 305/700; 371/19

[56] References Cited

U.S. PATENT DOCUMENTS

| | | | |
|---|---|---|---|
| 4,396,983 | 8/1983 | Segarra et al. | 364/DIG. 1 |
| 4,649,473 | 3/1987 | Hammer et al. | 364/DIG. 1 |
| 4,688,170 | 8/1987 | Waite et al. | 364/DIG. 1 |
| 4,787,028 | 11/1988 | Finfrock et al. | 364/DIG. 1 |
| 4,954,941 | 9/1990 | Redman | 364/DIG. 1 |
| 5,008,814 | 4/1991 | Mathur | 364/DIG. 1 |
| 5,155,837 | 10/1992 | Liu et al. | 364/DIG. 1 |

FOREIGN PATENT DOCUMENTS

| | | |
|---|---|---|
| 2242293 | 9/1991 | United Kingdom . |
| WO91/08534 | 6/1991 | WIPO . |

OTHER PUBLICATIONS

National electronics conference Proceedings of the National..., vol. 38, 1984, Kenneth Y. Nieng, "Updating Software in a Real-Time Distributed System" pp. 57-p. 60.
Patent Abstracts of Japan, vol. 13, No. 572, P-978, abstract of JP, A, 1-239633 (NEC Corp.), Sep. 25, 1989.
Patent Abstracts of Japan, vol. 14, No. 104, P-1013, abstract of JP, A, 1-307825 (NEC Corp.), Dec. 12, 1989.
Patent Abstracts of Japan, vol. 12, No. 350, P-760, abstract of JP, A, 63-106047 (NEC Corp.), May 11, 1988.
R. C. Summers and C. Wood; "Message-Based Protocol for Interprocessor Communication"; IBM Technical Disclosure Bulletin, vol. 22, No. 7, Dec. 1979, pp. 2893-2895.
R. R. Marsicek, T. S, McDermott, W. D. Modlin, J. G. Sams and C. E. Stricklin; "Distribute Data Processing System"; IBM Technical Bulletin, vol. 23, No. 5, Oct. 1980, pp. 1805-1810.

*Primary Examiner*—Thomas M. Heckler
*Attorney, Agent, or Firm*—Johnson & Wortley

[57] ABSTRACT

In telecommunications switching system, software is frequently modified, enhanced or replaced altogether by new versions. The implementation or integration of the new or revised software into the operational system must be accomplished in accordance with strict requirements for not disturbing the ongoing activities of the system. Therefore, it is desirable that the system not be halted while the change to the new software is made. Rather, the preferred approach is to be able to replace software modules with new versions on the fly, during system operation. The smooth modification made possible in the disclosed system allows such changes with minimal disturbance to ongoing activities. The disclosed system provides the ability to change software during operation by treating the dynamic operations of a telecommunications system as a set of parallel, independent transactions, with each transaction consisting of a series of connected activities. Such a transaction is generally a functional element associated with a particular user of the system, e.g., a subscriber or an operator, such as a call to be processed or a command to be executed by the system.

95 Claims, 6 Drawing Sheets

COMMON INTERFACESPECIFICATION

```
CLASS X;                                    ─171
 ACCEPTS
   METHOD CONSTRUCTOR(size INTEGER);
   METHOD Mx(IN data INTEGER);
   METHOD DESTRUCTOR();
END CLASS X;
```

SPECIFICATION OF UNIT
USING THE INTERFACE

```
UNIT XUser;            ─172
CLIENT OF CLASS X;
END UNIT XUser;
```

SPECIFICATION OF UNIT
USING THE INTERFACE

```
UNIT XProvider;        ─173
SERVER OF CLASS X;
END UNIT XProvider;
```

GENERATED C++-CLASSDEFINITION FOR
XUSER

```
class C_X{                                  ─174
 public:
   enum InterfaceId{Id=1};
   static C_X* Create(int size);
   virtual void Mx(int data)=0;
   virtual ~C_X()=0;
 private:
   void* xxxNotUsed;// only here to
assure compatibility
};

class X{
 private:
   C_X* p;
 public:
   create(int size)
     {p=C_X::Create(size);}
   void Mx(int data);
   ~X()
     {delete p;}
};
```

GENERATED CLASSDEFINITION FOR
XPROVIDER

```
class S_X_Data;                             ─175
class S_X{
 public:
   static S_X* Create(int size);
   virtual void Mx(int data);
   virtual ~S_X();
   S_X(int size);
 private:
   S_X_Data* D;
};
```

*FIG. 10*

SYSTEM FOR CHANGING SOFTWARE DURING COMPUTER OPERATION

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the patent and trademark office, patent file or records, but otherwise reserves all copyrights whatsoever.

1. Field of the Invention

The invention relates to the modification of software, and in particular, to the replacement of software in an operating computer system.

2. Description of the Related Art

One aspect of computer software is that it must be periodically updated with revisions, additions and/or deletions in order to continue to provide adequate functionality to the user, to optimize the software and to correct errors and discrepancies that arise throughout the life of the software. As new features are added to software, it is desirable to replace the old software with the new versions as early and as easily as possible in order to provide the user with the features of the new software.

In certain types of computing systems, such as stand-alone or batch processing systems, changing software from one version to another presents few obstacles. Typically, the computer system is merely shut down during a period of the day when there is little activity and maintenance personnel are readily available. The old software is then simply removed and replaced by the newer version of the software. Thereafter, the computing system is restarted and all future data processing is done with the new version of the software. This procedure, of course, assumes that the new software has been adequately tested and debugged on an offline system to the point that the software personnel and the operational management are confident that it will adequately perform the functions for which it is intended without undue interruptions that may require halting and then re-starting the entire computing system.

In other types of computing systems, such as modern stored program control (SPC) telecommunications exchange systems (commonly referred to in the industry simply as "switches"), neither the testing of new versions of software nor the changing of software in the system is as easy as in standalone batch processing systems. For example, new versions of software cannot be effectively tested without being placed into actual operation processing calls. The software must be tested while in operation in order to determine whether the software will adequately function under live operating conditions and whether the new portions will properly interface with all of the other software blocks that form a part of an operational SPC switching system. In addition, telecommunications switching systems are virtually never out of operation. Ideally, these systems would run perpetually, without interruption because of the continuous need for communications services within a community. That is, there is a continuous flow of telecommunications traffic being processed through the system even at off hours of the day or night and any interruption in the operation of the switch results in a disruption of that telecommunications traffic. Such a disruption could be extremely damaging to the system's operation and its effectiveness, as well as to its acceptance among users or customers of the system.

These real-time requirements of telecommunications switching exchanges place severe constraints on both the testing of enhanced versions of the software, or portions thereof, containing new or improved functionality, as well as the substitution of software containing error corrections or "bug fixes" into the switch without disrupting existing telecommunications traffic being processed by the switch. Therefore, integrating new versions of software components or units into the system using the traditional "edit-compile-link-load-run" approach is not desirable. What is preferred is a method that provides the capability to modify or extend the software while the system is in operation, without the need for any downtime.

Attempts have been made to solve the problems associated with incorporating new software into operating computer systems. For example, some advanced on-line operational systems in use today that do not operate in a stand-alone or batch fashion solve the problem of replacing old software in a manner that clearly differs from the method used with stand-alone or batch systems. However, such systems still replace software manually, although more transparently than in stand-alone systems, by requiring that individual users or user groups actively select whether or not to process using the new or revised version of the software. This option may be exercised by users by modifying the concatenation of software to be utilized by processes operating under their individual user-id. The option remains available to users during a fixed period of time, usually measured in weeks or months, in which time the software migrates up several levels in the concatenation structure after successfully operating at each prior level without any discrepancies. Upon reaching the top level of the concatenation, the software is declared "operational" and older versions are no longer available to users of the system. Insertion of new software into the system, as well as its migration up the various levels, is controlled by a process of configuration management—a manual process of reporting, approval, tracking software versions at each level and implementing approved changes.

As with the methods used to update software on batch or stand-alone systems, there are well known drawbacks to incorporating new or modified software into a system in this fashion. It is largely a manual, labor intensive system that is complex and time consuming. It leaves control over whether and in what cases the system will operate with certain new software to the users with no means of performing gradual, restricted, on-line use so that errors do not proliferate or immediately affect all ongoing operations. The method of controlling access to new or revised software is directly linked and limited to the individual user executing the software.

Other attempts to solve at least some of the problems associated with updating software in operational computer systems have taken a different approach. For example, in U.S. Patent No. 5,297,285, issued Mar. 22, 1994, containing an invention by Anders Abrahamsson and Lars Holmqvist and assigned to Telefonaktiebolaget L M Ericsson, there is disclosed a system for dynamically linking software during run-time. That system, however, involves a complex system of indirect addressing that requires use of either a specialized or extended operating system and/or a special compiler.

That system also has several drawbacks, including the need for a non-standard operating system. Further, the system will not work with standard applications software. The system is also limited in that it only addresses a portion of the overall problem and does not provide assistance in the areas of gradual testing and changing of control between existing and revised software modules.

In the typical telecommunications system in use today, the problem of changing software or portions of software is even more severe. Although such systems cannot properly be called batch or stand-alone systems, their operation will also be affected whenever a software change is made. The new software is loaded and the data that belonged with the old software is converted and transported to the new software. During the time when this transport is going on, the system cannot register any new calls. This period of disfunction can last as long as an hour or more, making it necessary to schedule software changes for off-peak hours of operation. Even so, an hour of downtime in a telecommunications switching system a very long and costly period because no new calls can be processed during this period and any needs for emergency communications during this time cannot be serviced.

Therefore, it would be highly useful within the telecommunications industry to be able to test and change software during actual operation of the telecommunications switch without disrupting ongoing telecommunications traffic through the system. It would be of further benefit to the telecommunications industry to have the capability to direct a limited and specified portion of traffic through the new software or new portions thereof, so that the software could be tested in an operational environment prior to handling live data. A smooth, transparent method of changing software during operation of the system that requires no special compilers would thus be highly desirable. The system of the present invention provides such a method.

SUMMARY OF THE INVENTION

The dynamic behavior of computing systems such a SPC telecommunications switching systems can essentially be described as a series of parallel, relatively independent transactions (also referred to a "threads" or "chains of events") wherein every transaction consists of a number of related activities. A transaction typically performs a job that is visible and functionally useful to the external user of the system. In a telecommunications switching system a typical transaction may be a call.

Online software replacement using the smooth software change techniques of the present invention makes use of transaction oriented software together with a memory capable of storing both old and new software versions at the same time. A smooth change over to a new software version is accomplished by letting ongoing transactions, i.e., "old traffic", run to completion using the old software version. Transactions started after the software change has begun, i.e., "new traffic", will in a gradual and controlled way be run using the new software version.

Principal requirements satisfied by the smooth software change techniques of the present invention include minimal or no user disturbance and a high level of system availability. Principal characteristics of the present invention include the facts that: (1) minimal or no disturbance is experienced by an individual user of the system during a transaction (e.g., a call) because one and only one software version controls each specific transaction, i.e., the system uses either the old software version or the new software version from the start to the end of the transaction; and (2) no unavailability is experienced by an individual user of the system because of the software change since both software versions are used in parallel during the change. If this latter characteristic was not present a simpler solution would be to simply make an offline change of the system software.

The data to be treated by the system can in this context be separated into two different classes: (1) dynamic data which is created and used during a transaction and which is deleted after the transaction is completed; and (2) semipermanent data which is used by and survives several transactions, for example in telecom systems, data about subscriber numbers connected to the system or short numbers used by certain subscribers.

A crucial problem associated with online software replacement where minimal disturbance is required is that the state of the old software version has to be transferred to the new software version. With smooth software modification in accordance with the present invention the separation of dynamic and semipermanent data makes this problem simpler in that only the semipermanent data, if any, has to be transferred from the old software to the new version. Further, semipermanent data is typically implemented as objects in a separate data base and is more seldom changed than other parts of a telecommunications software system.

The system of the present invention provides for the installation of new software into the stores of the telecommunications system along with, and in addition to, the old software. In the system of the present invention, existing traffic in the system is initially processed by the old software and test traffic is routed through the switch for processing by the new software. Thereafter, if the test traffic is handled successfully by the new software, a portion of the actual live traffic (or normal traffic) is selectively routed through the new software with the remainder of the live traffic still being handled by the old software. The percentage of live sample traffic handled by the new software may be varied between zero and one hundred percent. Should the sample traffic be carried adequately by the new software, all of the traffic is directed to the new software. As soon as the processing of all calls being handled by the old software has been completed, the old software is no longer utilized by the system and may be removed from the system.

In another aspect, the system of the present invention comprises a system for smooth verification of new or modified software. The system of the present inventions allows data to flow through the new software in a gradual and controlled manner, yet as part of the live operational system. The system provides for early detection of errors and discrepancies with little or no impact to actual operation of a telecommunications switching system because the initial data routed to the new software is only test data generated by the system. If, in processing test data, the telecommunications system detects an error, no further traffic is directed to the new software so that, even if the new software had been processing actual data, disturbance to the overall traffic of the system is minimized.

In another aspect of the systems of the present invention, the system redirects traffic from the old software to the new software in a gradual manner. The system of the present invention includes the capability to allow transactions that began processing with the old software to complete its processing using only the old software. Only transactions that began subsequent to the installation of the new software will be processed by the new software. This aspect of the system of the present invention results in only a minimal disturbance to users during a transition phase from certain old software to its replacement by or augmentation with new software. Further, this aspect minimizes the amount of data requiring conversion for and/or transfer to a different set of software than that with which it was initially processed.

In yet another aspect, the system of the present invention comprises smooth modification of software, a process that models the operation of software as a set of identifiable and maintainable transactions. In the system of the present invention such chains are identified and maintained throughout processing. In addition, in this aspect, the system of the present invention controls the connection of each transaction to either the new or the old version of the software during the time period when both versions simultaneously reside within the telecommunications switch.

In another aspect, the system of the present invention comprises mechanisms for converting and moving possible existing semipermanent data included in and directly controlled by the old software unit into the new software unit.

In another aspect, the system of the present invention comprises a set of direction points used to dynamically direct transactions within the operational system to either new or old versions of the system. The system accomplishes the dynamic direction through a number of means, including analysis of messages addressed by function name, and dynamic runtime linking of software units.

In yet another aspect, the system of the present invention comprises an instantaneous modification method. This method is used when coexistence of two versions of the software is not possible and provide a momentary change from the old software version to the new software version. All traffic is automatically redirected to the new version until such time as errors in the new version are detected which make it impossible or impractical to operate using the new version. At such a juncture, the system may, if halted, return to processing all traffic using the old software version by a new instantaneous modification. The system in this aspect retains the old version in a passive state within the system.

In yet another aspect, the system of the present invention comprises a linked procedure (call) mechanism that embodies a trader and a kernel to enable an interface between software units of differing classes. This linked procedure call mechanism is also used to effect the inter-linking and binding of old and new software units during runtime. In employing this linked procedure call mechanism in the system of the present invention, the necessary interface specification is created utilizing another aspect of the system of the present invention, a specialized object-oriented interface description language is used and referred to a ELIN. This language contains a special construct that is geared for developing interfaces for the linked procedure call aspect of the system of the present invention.

In yet another aspect, the system of the present invention includes an addressing mechanism for messages with a function name address that embodies a trader or message routing mechanism to enable an interface between software units that can be distributed in the system. This mechanism is also used to direct messages to old and new software units during runtime. In employing this addressing mechanism in the system of the present invention, the necessary interface specification is created utilizing another aspect of the system of the invention, the specialized language referred to above as ELIN. This language contains a special construct that is adapted for developing interfaces for the message protocol aspects of the system of the present invention.

As will be readily appreciated by those of ordinary skill in this particular art, the principles and aspects of this invention could also be utilized to advantage the runtime conversion of software in a variety of computer applications other than telecommunications switching systems.

BRIEF DESCRIPTION OF THE DRAWINGS

For an understanding of the present invention and for further objects and advantages thereof, reference can now be had to the following description, taken in conjunction with the accompanying drawings in which:

FIG. 10 is a chart illustrating certain aspects of the system of the present invention.

DETAILED DESCRIPTION

The system of the present invention utilizes, in some aspects, principles of object-oriented programming. Object-oriented programming involves essentially four elements—classes, objects, instance variables (or data members as implemented in C++), and methods (or member functions in C++). A class is simply a template used to define objects, which are instances of the class they are created from. Classes have two types of components—instance variables and methods. Instance variables serve as data elements and methods serve as functions, i.e., they define an object's behavior. Each of these is combined in a single common object on module in operation. Hence, programming is performed with a focus on objects, rather than on the functions or tasks to be performed.

Certain techniques of object-oriented programming, well known in the art, are incorporated into the system of the present invention in the preferred implementation of the system of the present invention in the programming language C++. Such techniques include inheritance, polymorphism and encapsulation. Inheritance enables a new class to be derived from an existing class so that code is easily reusable, so that data and code can be added to a class or the behavior of a class can be altered, without having to change the existing class. Polymorphism is the property that provides the ability to alter the behavior of a component that is shared by different objects, allowing different instances of the component or object to behave differently although they appear to be identical. Finally, encapsulation is a technique for combining the data and operations needed to process the data all under one "roof." It further allows the capability to protect the data from excessive or unnecessary access and to hide the details of the data organization.

Figure 1A:
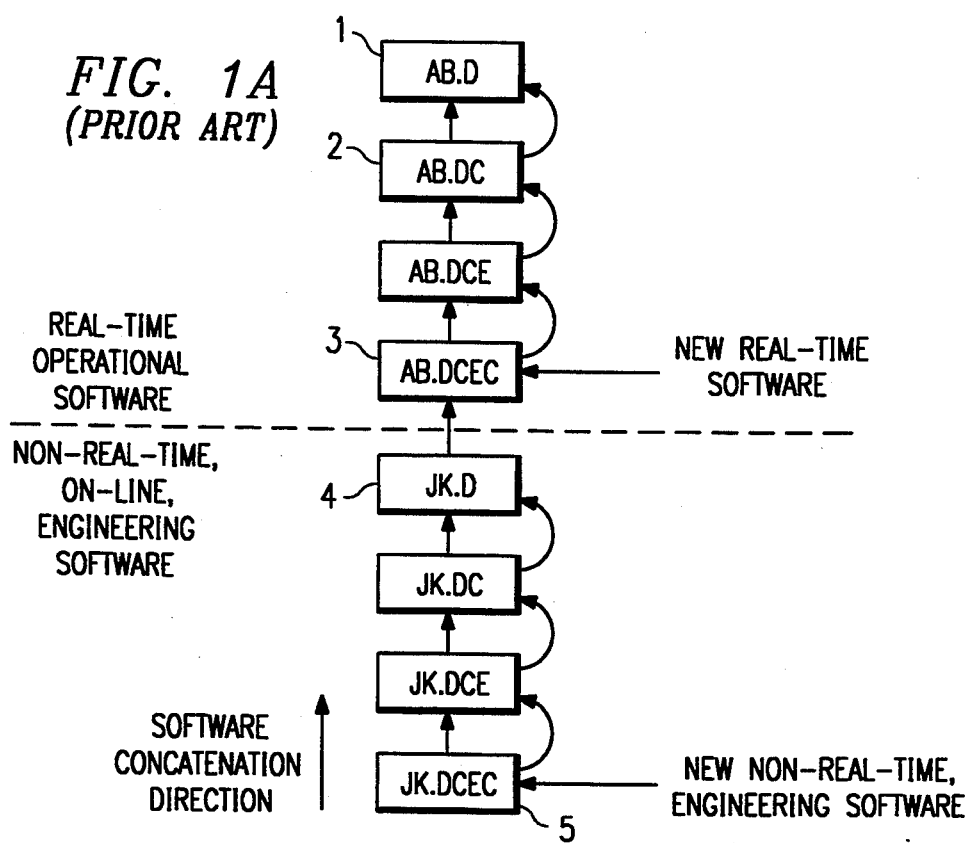
FIGS. 1A-1B are diagrammatic illustrations of a prior art system for controlling the introduction of new or modified software to an operational software system.

Referring first to FIG. 1A, there is illustrated a software control scheme utilized in a prior art system for managing the introduction of new or modified software into an operational software system. FIG. 1A illustrates a hierarchical set of software levels, the contents of each of which is controlled by the members of a review board. All changes to the software must be approved by this board prior to such changes being implemented in the system. No software will be integrated into the system until the review board makes a formal determination that the software is needed, that it has been adequately tested and that it is not likely to cause damage or interruption to the system.

The hierarchy of levels may be composed of several separate hierarchies linked together by an individual user who has access to and need for those levels or "libraries" of software to perform his or her function. At the top of the hierarchy 1 is the real-time, operational software that is typically most widely used and most strictly controlled ("AB. D"). Below this level is a change library 2, designated by the additional letter C in the suffix ("AB. DC"). Lower levels of operational software within the hierarchy may belong to different groups of users within the system and will be controlled by review boards at those levels. New or modified real-time software enters the system, after approval, at the lowest appropriate change level, i.e., a level that ends with the letter C as at 2 and 3.

Once new or modified software enters the system, it remains at the entry level until a specified period has passed and the software has produced no detectable errors. It will then migrate to the next highest level. In some cases, this will require advance approval by a specified review board; in other cases the migration will occur automatically, as part of a regularly scheduled system activity. The migrations are transparent to the users and the software will be available immediately upon migration or entry to the hierarchy to users who have structured their software concatenation to access software in the libraries containing the new or changed software.

As also illustrated in FIG. 1A, the same process may be repeated and occurring simultaneously for non-real-time engineering type software that resides within the same system. The only difference in this case is that the control process is managed by a different set of people and the process may not be as rigorous as that for operational software used generally throughout the system for critical processes. The integration of the software occurs in the same manner for this engineering software as with operational software, however. The new or modified software enters the hierarchy at the lowest appropriate change level as designated by a C as the last letter in the suffix, as at 4. It then migrates in an upward direction over time, with the necessary approvals, until it reaches the top 5 of its portion of the hierarchy. With either engineering or operational software, once it has migrated to the next level it no longer resides at the lower level.

The decision whether to utilize the new or modified software entered into the system's hierarchical libraries is left to the individual user or user group. The user(s) may select which levels of the libraries the system is to use in concatenating software for their use. They may choose to bypass lower levels of software altogether or they may simply choose to avoid the lowest change level which contains the newest and least tested software. The highest level of each portion of the hierarchy, of course, contains the bulk of the in-use operational software.

Figure 1B:
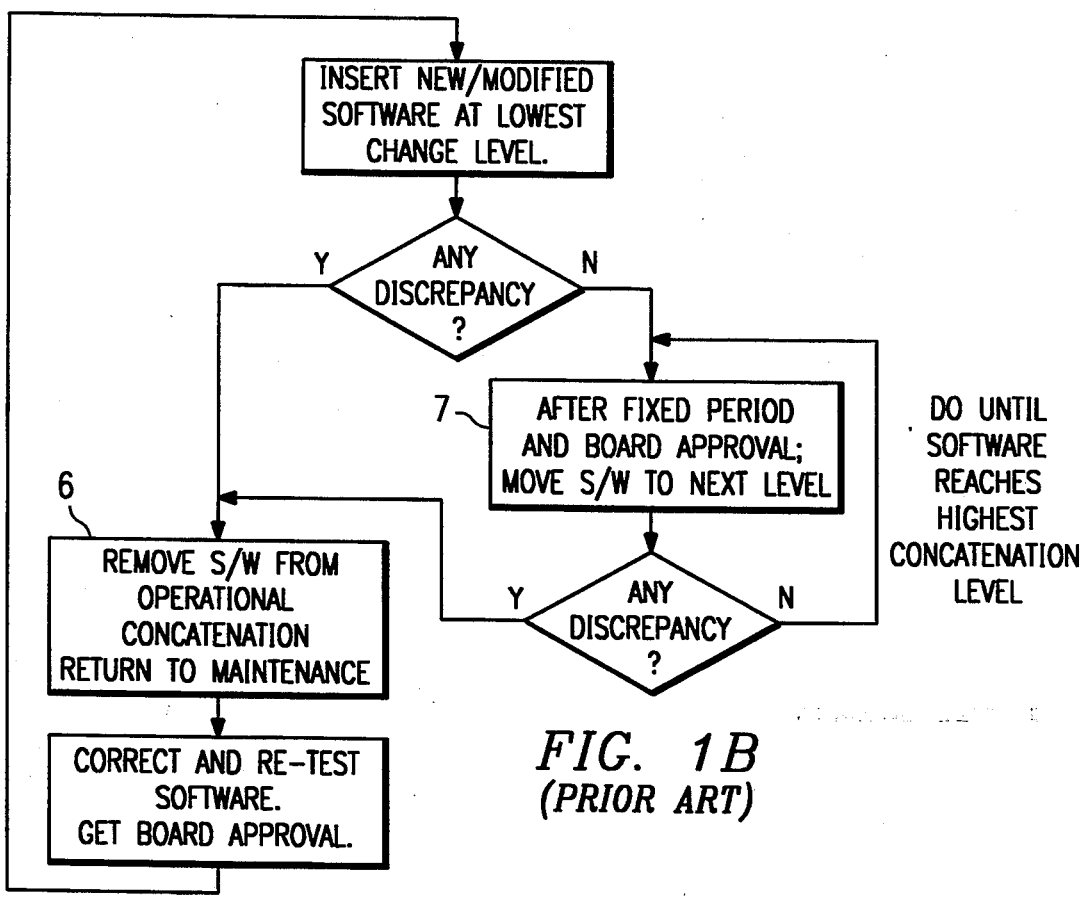

FIG. 1B illustrates the human process of configuration control that is imposed upon the software library hierarchy illustrated in FIG. 1A in order to maintain control over both the baseline and the new or modified software being introduced to the system on a daily basis. As noted above, the new software enters the hierarchy at the lowest appropriate change level following approval by the review board. If the new software results in errors or discrepancies, the software is removed from the hierarchy and returned for additional software maintenance work as at 6. Once the problems have been corrected and the software has been retested, it may once again, upon board approval, be integrated into the system at the lowest change level. If no problems are detected within the fixed period allowed, the software will automatically migrate to the next level unless the next level requires another board approval as at 7. Otherwise, it will migrate on a fixed schedule after having been properly approved. This process will continue to be repeated until the software reaches the highest level in that portion of the hierarchy at which time it will be declared fully operational software.

Figure 2:
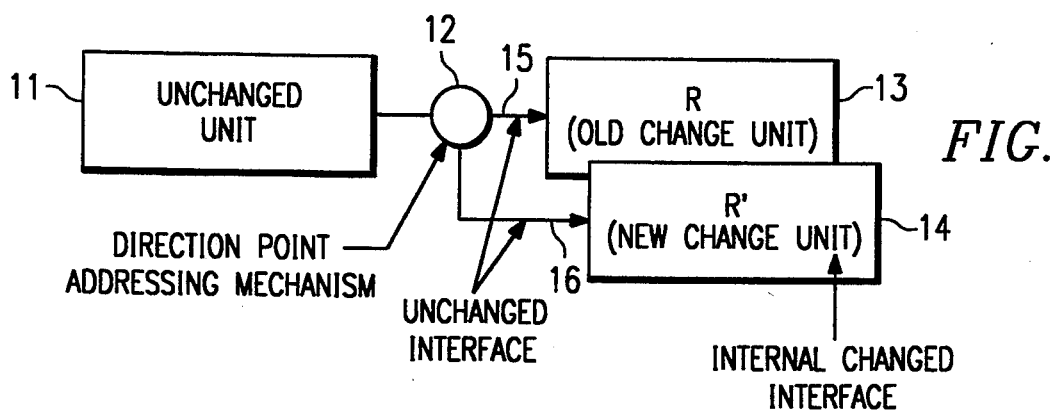
FIG. 2 is a block diagram illustrating an exemplary procedure for redirecting processing from an old software unit to a new software unit in accordance with the system of the present invention.

Referring next to FIG. 2, there is illustrated one aspect of the present invention depicting a mechanism through which a smooth modification or change of software may take place. This smooth modification aspect is a feature that allows, during a certain time period, the system to store in primary memory both the old and new versions of the software. New traffic may then gradually be introduced to the new version of the software with this introduction being made such that old transactions are executed to their conclusion by the old software version while new transactions are executed by the new software version. In FIG. 2 there is illustrated an unchanged software unit 11 coupled through an addressing mechanism 12, called a direction point, to an old change unit 13 and a new change unit 14. Unchanged interfaces 15 and 16 link the old change unit 13 and the new change unit 14 to the addressing mechanism 12.

In the manner illustrated it is possible to allow traffic to be introduced to the new software version in a controlled way. It further allows the old software version to continue operating on live data while the new software version simultaneously processes first test traffic and then certain specified sample live traffic as well. Because the two software versions may coexist within the system, transactions which have begun processing with the old software version will complete execution using the old software version. Traffic first processed by the new software version will likewise only be processed by the new software version. This process of smooth modification allows introduction of new transactions gradually to the new software, thus reducing the risk of disturbance to the system users. This aspect requires, as illustrated in FIG. 2, the capability to represent the system execution as a set of parallel, independent transactions, as well as the capability to identify each transaction and to maintain and control its connection to either the new or the old software version.

It is quite possible, and in fact typical, in the system of the present invention to replace only part of the software at a time. The software to be replaced is referred to as a change unit. FIG. 2 illustrates the case in which there is a change unit R in both the old software version, i.e., the old change unit 13, and in the new software version, i.e., the new change unit R' 14. The new change unit R' is by definition chosen to have an interface 16 that is compatible with the existing interface to the unchanged software 11. This means that the unchanged software is able to cooperate with both the old and the new software version (change unit).

This aspect of the present invention, i.e., providing for the dynamic direction or re-direction of transactions, is facilitated by the introduction and use of direction points. These direction points consist of the places in the distributed system at which transactions may be directed in a particular way. The addressing mechanism 12 as illustrated in FIG. 2 represents the implementation of the direction points and the means by which the system's transactions are individually directed to either the new or the old software version. These direction points are capable of operating in two different ways. First, they may be triggered by analyzing the function name associated with traffic being processed by the system. According to this method of operation, traffic can be directed to either a new or old software version of the particular function required to perform the necessary processing. Second, transactions can be directed to execute a new or old software version of a program based upon information supplied as a result of runtime linking of the software.

The fact that multiple versions of a software part may coexist for a certain period within the system has a number of consequences. For example, this smooth modification aspect of the present invention requires, in the event of changes to semipermanent data representation, that both the new and the old software version can access the appropriate data representation.

Referring next to FIGS. 3A-3E, there are illustrated the phases that a change unit may pass through in the general case of a modification. In practical operation of the system, a particular change unit will likely pass through only a subset of the illustrated phases. Further, in practical operation, the illustrated phases are not a strict set of serial operations to be performed. Rather, one or more of the phases may be repeated during the course of a modification. An important feature of this aspect of the present invention is that the control of the various phases of the modification process is transparent both to users of the system and almost transparent to the applications software programs themselves. The illustrated phases are controlled by a coordinator that operates at the various direction points existing within the system.

Figure 3A:
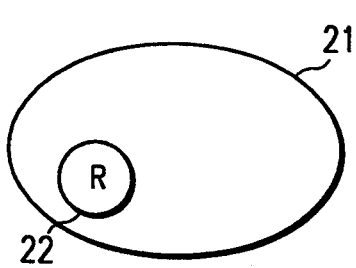
FIGS. 3A-3E are diagrammatic illustrations of a process of changing from old software to new software in accordance with the system of the present invention.
Figure 3B:
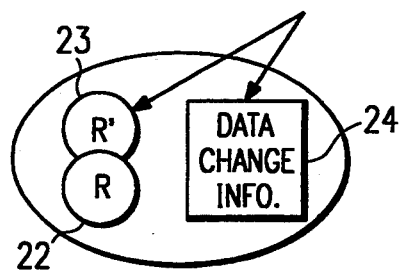

FIG. 3A represents a system 21 including a change unit R 22 embodied within it. This represents the position of the system at the start of the modification process. The system, at this point, is directing all ordinary traffic toward the old software version. FIG. 3B represents modification of that change unit 22 by means of a new version R' 23 coupled with the data change information 24. While FIG. 3A illustrates the position at the start of modification, FIG. 3B represents the initial or loading phase in which the new software R' 23, and in some cases the new data scheme contained in the data change information 24, in addition, are loaded together with the old change unit R 22. The data change information 24 has been specified in the software development system due to the fact that the data representations for both the old and the new versions are known.

Figure 3C:
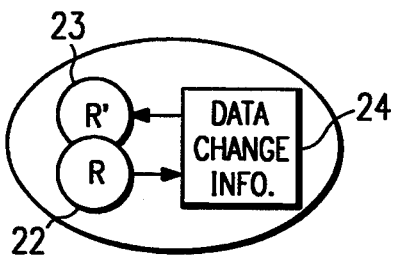

FIG. 3C graphically depicts the change of data phase of the modification process. The aim of this phase is to, at the appropriate moment, move relevant parts of the possibly existing semipermanent data, as set forth above, included in and directly controlled by the old software part into the new software part, i.e., that which is replacing the old one, in order to avoid unacceptable disturbances. Implementation of this aspect of the invention is managed by performing several different activities. First, activities concentrated within the data change phase include: (a) conversion of data from old to new representations in the event that the data representation in the replacing new software part has been changed from the data representation used in the old software part; and (b) transfer of data from the old software part to the new software part. Second, the activity spread over the testing phase and the completion phase, that is, the phases when both old and new software are used in parallel, includes for each "original" update of semipermanent data in either the new or old software part there is made a subsequent update of the corresponding semipermanent data in the other. That is, a subsequent update is made in the old software if the original update was made to the new software and vice versa. This means that, in the general case, both conversion and transfer of data each time semipermanent data is updated by the new or old software. The data conversion is dependent upon data change information created in the support system during software development and loaded into the target system during the initial/loading phase, referred to as "data change info" in FIG. 3.

With respect to data conversion, an alternate implementation of a system may only convert the representation of the data into the form used by the new software on an as needed basis and then, before the old software is removed from the system, convert all of the remaining data not yet needed by the system by that time. Likewise, all the data could be initially converted into the representation used by the new software, in order to save memory space, and then a reconversion program used to convert the data back into the form used by the old software on an as needed basis until it is removed.

A third phase of the modification process, also graphically depicted in FIG. 3C, is the testing phase. This phase is intended to allow the new software version to be loaded into the system and operate initially only on test data to determine the quality level of the software prior to using it operationally with live traffic. This testing phase may be divided into two subphases: (a) testing with test traffic, that is, only artificially generated transactions will utilize the new software version; and (b) testing with sample traffic, that is, a selected percentage of actual, new transactions somewhere between zero and one hundred percent of the total live traffic will be directed to be run with the new software version. Toward the completion of this second subphase, most or all of the live traffic will be operating under the new software version.

The test traffic is generated either by means of special software or by using special test subscribers. The test traffic is controlled so that it is guaranteed that the changed unit R′ 23 is used. This result is ensured by marking the test traffic with a test flag that will automatically direct that traffic to the new software version at all direction points at which there is a choice between a new and an existing old software version. For ordinary live traffic, the decision whether to employ the new or the old software version is made at the first direction point encountered at which there is a choice. Thereafter, that traffic or transactions is processed only by the selected software version. A change to the other version at a later direction point is prohibited in the system. If, during this phase, the testing indicates that problems or errors are occurring as a result of using the new software version, the modification is rolled back and all new transactions are directed toward the old software version.

It should be noted that in certain implementations the amount of sample traffic used with the new software version following successful processing of test traffic can be reduced to zero. In such cases, once the new software version has been proven with test traffic, the full load of all new transactions can be transferred to it to allow it to completely replace the old software when all the old transactions have been completed.

A fourth phase, graphically depicted in FIG. 3C, is the completion phase. In this phase, transactions that have been utilizing the old software version continue to use the old change unit R 22 until no more transactions that use the old change unit R 22 exist within the system. This will occur naturally as new transactions use the new software version. During this phase, both software versions remain in the system memory and the new software version continues to be considered as in a testing phase.

The completion phase can either continue until all old traffic using the old software version has come to completion or it can be set for completion at a specified time. If there are any old traffic still using old software version by the end of the completion phase then they will be terminated or, if possible, transferred to the new software version. Thereafter, the semipermanent data owned by the old software version will no longer be updated, the old change unit will be blocked and the completion phase ended. It should be noted that the testing phase preceding the completion phase may have been ended by means of a long period of time during which all new traffic was classified as sample traffic and all old traffic had been completed. In this case, the completion phase would be very short and simply mean that the semipermanent data is no longer updated and that the old change unit is blocked.

The ending of the completion phase means that the entire software modification process has terminated. This state is graphically represented in FIG. 3D.

Figure 3D:
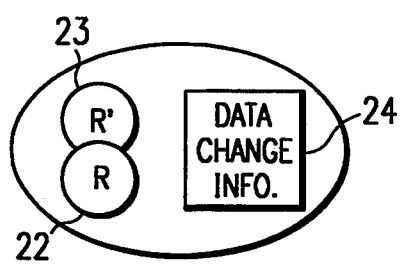
Figure 3E:
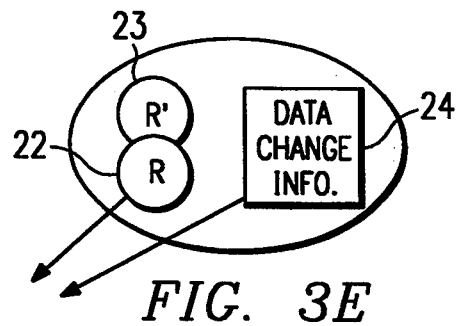

The old change unit R 22 and its change information are no longer maintained and, at this juncture, it is no longer possible to rollback to operating under the old software version. At this point if there is a problem with the new software version, an entirely new modification will be required. The old version of the software may now also be removed from the system. FIG. 3D graphically illustrates this state.

Another aspect of the system of the present invention comprises, as a complement to smooth modification, a method for instantaneous modification. This method provides the capability to effect an immediate or momentary switch from the old software version to the new version for purposes of processing all traffic. This type of modification is used when the application prohibits the coexistence of two different software versions within the system. With the instantaneous modification method, the software state at the moment of the switch can be converted if needed and transformed to the new version. This is possible in this system because the applications software has the capability to reproduce its state in the new software version. An important feature of this aspect of the system of the present invention is that although the changes are, internally, quite abrupt, the changes are transparent to the system users as well as to the traffic being processed. The traffic can be redirected to the new software version without causing any observable interruption to processing. Another advantage in this aspect of the present invention is that the old software version remains in the system, albeit in a passive mode. Therefore, if the new software version is shown to have problems or to be incorrect, a rollback to the old software version is still possible with no major or longer interruption in processing.

Figure 4:
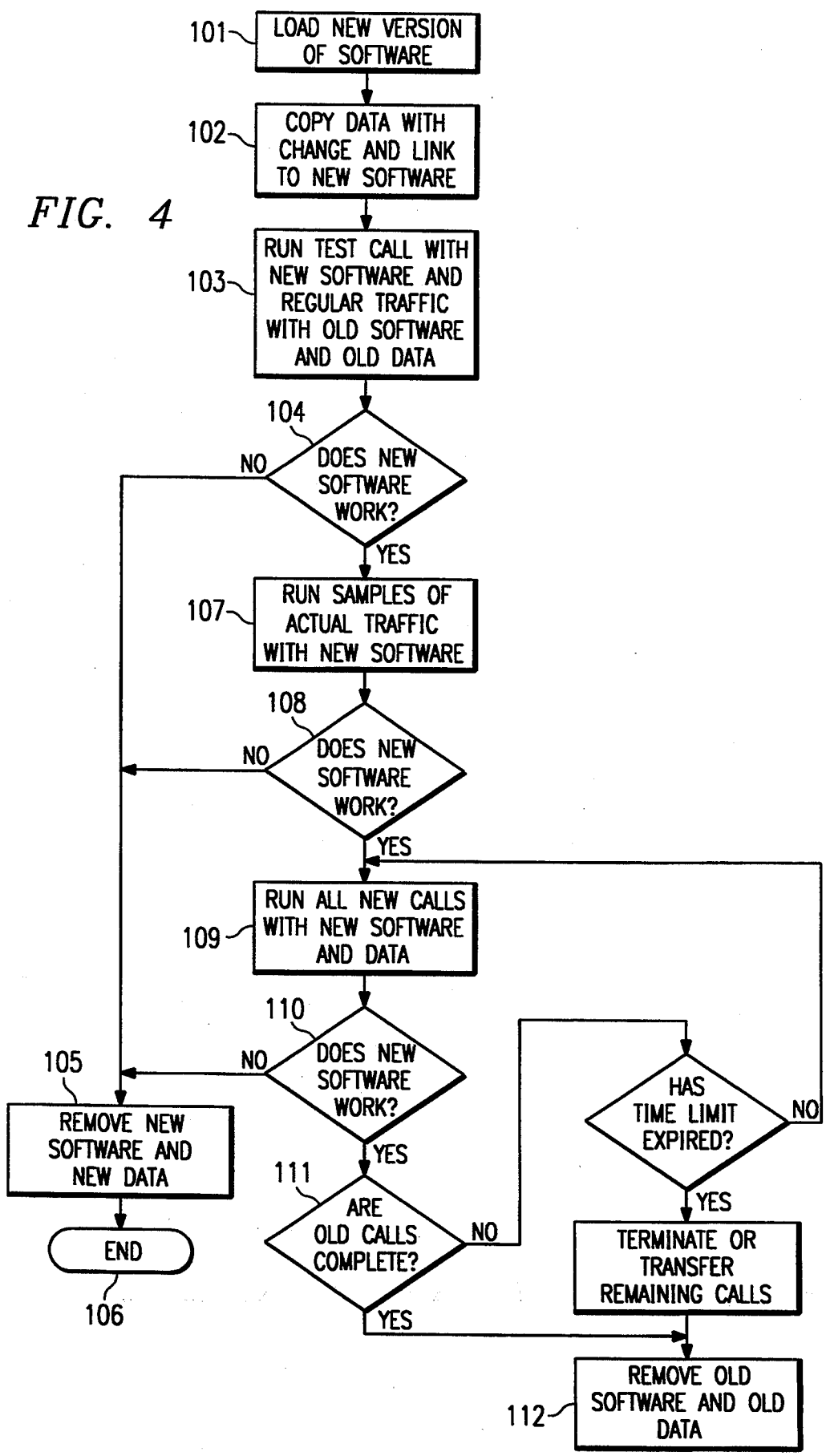
FIG. 4 is a flow chart illustrating the process of changing software during runtime in accordance with the system of the present invention.

Referring next to FIG. 4, there is shown a flow chart illustrating the smooth modification method of transition from an old software version to a new software version. In particular, the system presupposes that existing software is actively running in the system and begins at 101, with the loading of a new version of the software into memory. At 102, the system copies the data with its changes in the new version, and links it to the new software. At 103, the system begins to run test transactions with the new software and normal traffic continues to run within the system with the old software and the old data. At 104, the system queries "does the new software work on the test traffic?" If not, the system moves to 105 at which point the new software and data are removed from the system and the procedure ends at 106. If the new software does work on the test traffic at 104, the system moves to 107, at which point it runs samples of actual traffic with the new software while maintaining the remainder of the normal traffic along with the old software and old data. The percentage of sample traffic run through the new software may be selectively varied between zero and one hundred percent of the total live traffic. Next, at 108, the system again queries whether or not the new software is working on the sample traffic. If not, the system moves to 105, and the new software and data are removed to end the process. If, however, the new software is processing sample traffic successfully at 108, the system moves to run all future calls with the new software and the data at 109. Thereafter, at 110, the system again queries whether or not the new software is working and if not, moves to 105 to remove the new software and end at 106. If the new software is working on running the normal traffic in the system at 110, the system queries whether or not all the old transactions have yet been completed or not within the system at 111, and if not, queries if the time limit for the change has expired at 113 and, if not, continues to: (1) run all new transactions with the new software, and (2) run all old transactions with the old software at 109 until a yes is received at 111 or the time limit has expired at 113. If the time limit has expired at 113 the system terminates or transfers the remaining calls and moves to 112. If a yes was received at 111, the system moves to 112 and the old software is removed along with the old data, and the system has made a switch during runtime from old software to new software without unduly endangering or delaying existing traffic within the telecommunications switch.

Figure 5:
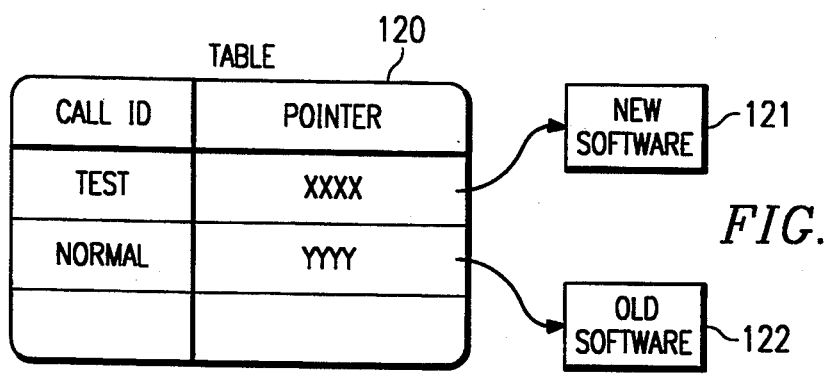
FIG. 5 is a block diagram illustrating the manner in which both new software and old software is selectively addressed in the system of the present invention.

Referring next to FIG. 5, there is shown a table 120 containing a Call Identification (ID) category and a Pointer ID category. For each call address within the system which is a test call, a pointer to new software 121 is given, while for all call IDs containing a normal identification, the pointer is given to the old software 122. FIG. 5 graphically illustrates the method by which the system of the present invention is able to properly direct both ordinary, live traffic and test traffic to the proper version of software.

While this is the general simplistic interpretation of the manner in which the old and new software are addressed within the system of the present invention, in fact, detailed linked procedure call mechanisms are used to create dynamic runtime binding between separately loaded program units. That is, when replacing a program unit, the old and the new versions of the software coexist for a time until the new version can be verified as correct and activities being executed in the old version can be ended as described above. A suitable linked procedure mechanism is disclosed in U.S. patent application entitled "System For Dynamic Run-Time Binding of Simultaneously Executing Software Modules in a Computer System", Ser. No. 07/907,307, filed on Jul. 1, 1992, now U.S. Pat. No. 5,339,430, in the name of K. Lundin et al, assigned to Telefonaktiebolaget L M Ericsson, and hereby incorporated by reference herein. The system of the present invention uses trading as a means to access the software through an interface via the linked procedure call. In loadtime, all interfaces accessible to the linked procedure call are published to a trader function in the kernel. Every interface is published with its identity and an address which refers to a method that creates an object from the interface. The binding between the software versions is made in runtime and every time an object is created for a specific interface, a request is directed to the trader or the address of the create method which is then called and returns an object pointer to the created object.

Figure 6:
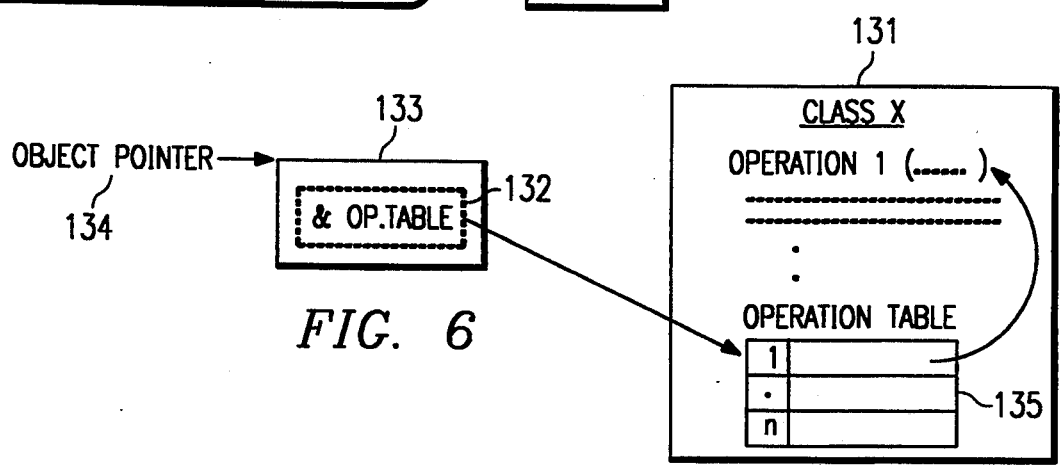
FIG. 6 is a block diagram illustrating the manner in which objects are addressed within the software of the system of the present invention.

As illustrated in FIG. 6, each object of class X 131 is called from a table 132 within the objects-data 133 by means of an object pointer 134 which, in turn, points to an operation table 135 within the object 131, the address of which contains definitions of the operation defined by the object of that class. A number of addresses referring to operation tables within the server's program unit are stored in the objects-data. In turn, the operation tables contain the addresses of operations belonging to the specific interface. Because the location of the addresses of the operation tables within the objects-data and the order in which the addresses in the operation tables are stored are fixed and known, operations can be called without assistance from the trader. One such operation in an interface that can be called without the trader is an operation to delete a created object.

Use of these operation tables provides the ability to achieve polymorphism, a concept that can be implemented using, for example, the programming language C++ and its construct for virtual tables. Polymorphism, meaning "many shapes," is a technique by which the behavior of a component that is shared by different objects can be changed. In other words, a component may appear the same in all cases, but may have the ability to perform in a somewhat different manner in connection with different objects with which it is associated. Polymorphism is useful in allowing the creation of families of objects that are related, i.e., they have a common origin or base, but they perform differently in different situations. This allows each object within a family to have methods or functions with identical names although the actual code for each object's methods may differ vastly. The system of the present invention utilizes polymorphism, as well as other principles of object oriented programming. The system of the present invention, however, implements and extends the principles in a new and highly useful manner, in order to achieve dynamic, transparent inter-linking of different versions of software during execution.

Figure 7:
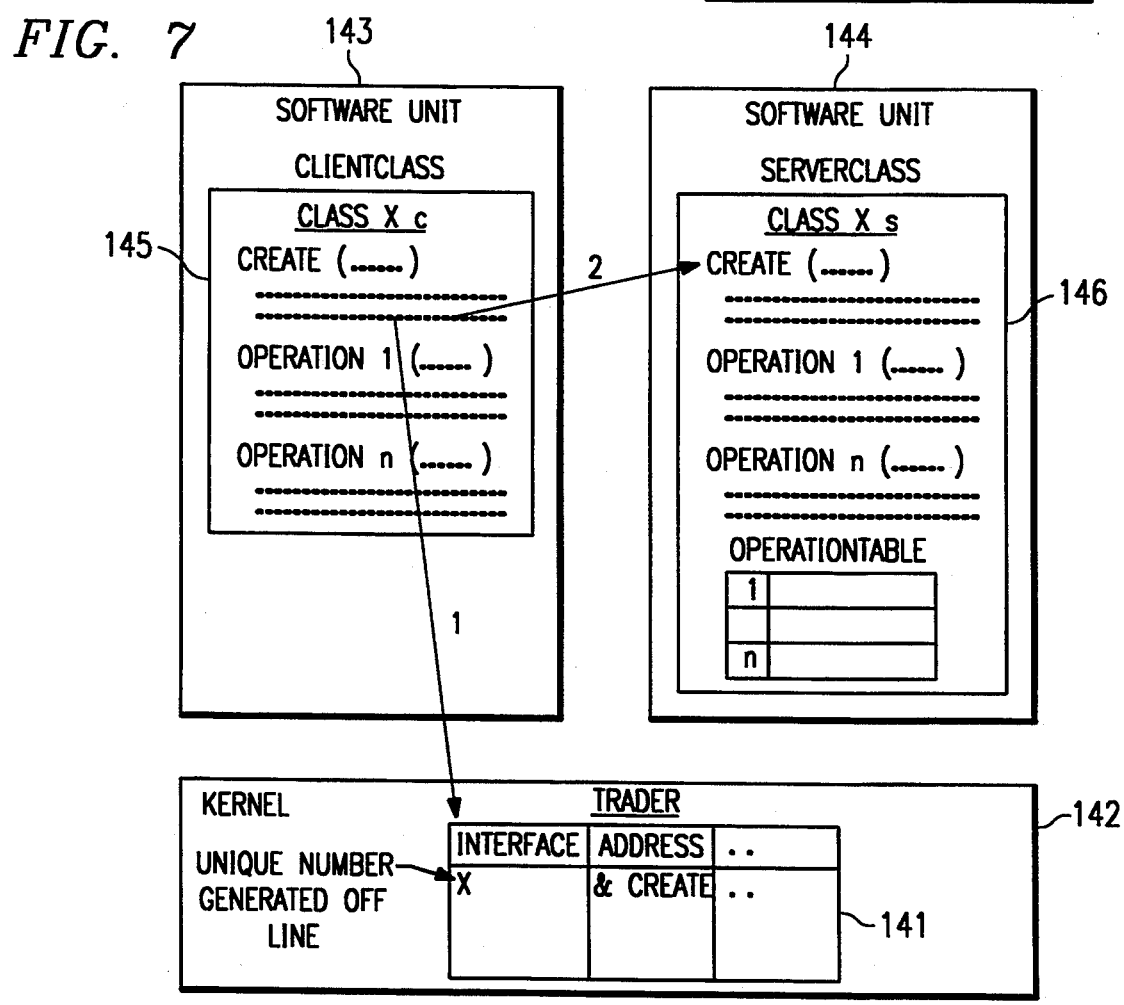
FIG. 7 is a block diagram illustrating the manner in which software is addressed within the system of the present invention.

Referring next to FIG. 7, there is illustrated therein the fact that the linked procedure call mechanism embodies the concept of a trader 141 contained within a kernel 142 which enables an interfacing relationship between a pair of software units 143 and 144, containing, respectively, a client class 145 and a server class of objects 146. FIG. 7 illustrates in detail the steps required in order to create objects within the system as shown also in FIG. 6.

Objects are language constructs that contain both data and code or functions within a single package or unit. Because they are able to contain both data and code, they act as miniature, independent programs. They can be used, therefore, as building blocks in creating more complex programs without having to redevelop the code necessary for those functions. Because they can be maintained and modified independently, program maintenance and revision is simplified.

A class is a template that is used to define an object, and an object is an instance of a class. A class contains two component types, instance variables or data members and methods or member functions. In order to support programmers developing programs for the client or non-server nodes of the computer system, a client-class is automatically generated through the use of an interface specification which acts as a sort of agent for the server-class. The client node of the system calls operations from the client-class in order to ensure that calls are transferred to the software implementation residing in the server-class. Therefore, all code relating to the dynamic binding function is found in the client-class.

Class declarations control the manner in which the compiler will store the addresses in the objects-data and in what order the addresses in the operations tables will be set forth. Some class declarations are automatically generated by the system. When an object is created within the system, its "create method" member function can be located through a request to the trader 141 portion of the operation system located within the kernel 142. The trader 141 contains all the interface information for all classes accessible by linked procedure calls within the system, i.e., it contains information for each object about which other objects it is accessible by or to.

Figure 8:
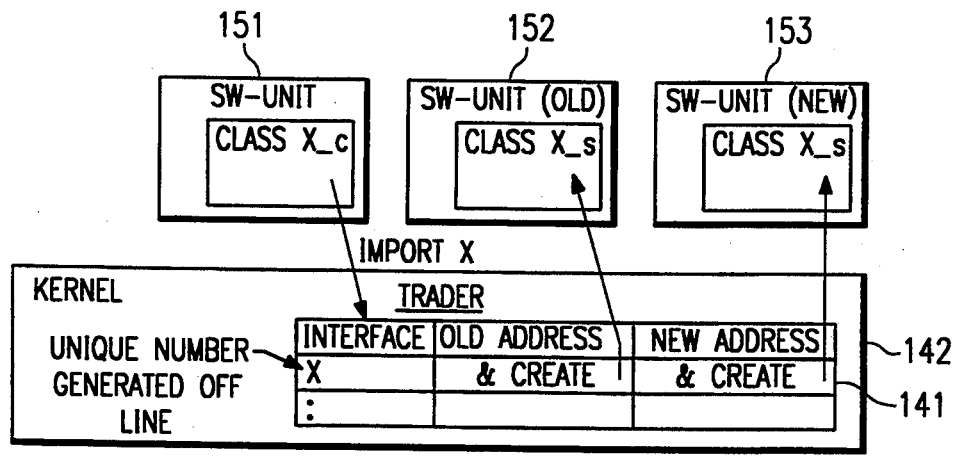
FIG. 8 is a block diagram illustrating the manner in which the trader addresses software in the system of the present invention.

The diagram of FIG. 8 illustrates the way in which the program unit's old software and new software are inter-linked and bound during runtime via the linked procedure call. The trader 141 within the kernel 142 can direct the execution of the software unit 151 toward either the old software unit 152 or the new software unit 153. While making the replacement, the server-classes from both the old and the new versions each have their interfaces published in the trader 141. The trader 141 contains two address entries for each item, one for the old software unit 152 and one for the new software unit 153. Transactions created prior to the replacement will receive an address pointing to the old software unit 152 and its server-classes while other transactions may receive addresses to new versions of the server-class.

After the replacement has been completed and the transactions using the old software unit 152 have ended, the old software unit 152 can be removed from memory and the interfaces published by the server-classes in the old software unit 152 may be withdrawn. If an attempt to withdraw these server-classes from memory is made prior to all transactions within the old software unit running to completion, the system generates an exception call from the kernel 142. An exception handling transaction within the system then allows the non-completed process the opportunity to redirect itself and utilize the new software unit 153 or else to terminate.

In employing the linked procedure call mechanism in the present invention, the interface specification is written in an object oriented interface description language referred to as ELIN as disclosed in U.S. patent application Ser. No. 07/907,293, filed on Jul. 1, 1992 in the name of K. Lundin and assigned to Telefonaktiebolaget L M Ericsson, hereby incorporated by reference herein. In this language, there is a special construct (class) that is specially aimed at the specification of linked procedure call interfaces. A class in the ELIN language is a specification of the interface provided by objects of certain types. These objects are well suited to be implemented as instances of a class if an object oriented programming language is employed. The specification of a linked procedure call interface in ELIN language comprises the following information:

(a) a name for the specification;
(b) other interfaces used as a base for this name;
(c) one or more constructors (used for creating instances); and
(d) zero or more method-specifications, each of which consists of a method name, arguments, return type and exceptions.

Set forth below, in code, is an example of an interface specification that could be used as part of this link procedure call mechanism and that describes an interface to stacked objects:

```
CLASS Stack;
    BASE
        CLASS TelecomObject;
    ACCEPTS
        CONSTRUCTOR (IN size Int);
        METHOD push (IN data Int);
        METHOD pop ( ) RETURNS Int;
        DESTRUCTOR ( );
```

```
END CLASS Stack;
```

© 1992 Telefonaktiebolaget L M Ericsson

This interface specification defines a class of stacked objects, the base class being called "TelecomObject." Objects of this class can accept message calls from the listed function members. Having a base identified for this class indicates that there is another specification of this type of class that is called TelecomObject. That base class also has certain specified methods which the current class, as an instance of the base class will inherit. The function members or methods specified in the above class definition are in addition to those specified in the base class. In sum, the above code comprises a class specification which is one type of interface specification that can be created within the system.

An interface can be derived from another interface which then is called the base interface of the derived interface. Interfaces can be derived from more than one other interface, with the derived interface inheriting from the operations of each of its base interfaces. The derived interface may, in addition, declare its own additional operations, although it may not define operations having the same name as those inherited from the base interfaces. It should be made clear that inheritance only affects the interface-level of the class, not the implementation level.

Figure 9:
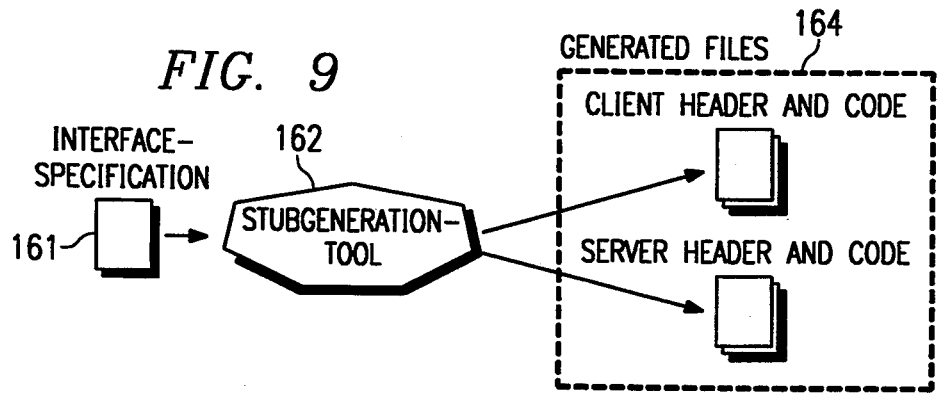
FIG. 9 is an illustrative diagram of the manner in which an object oriented interface description language is used to implement the system of the present invention.

As shown in FIG. 9, the system of the present invention also includes a stub-code generation tool 162 which is used to certify the coordination between the client and the server which are linked together dynamically in runtime through an interface. The interface is specified in a language independent fashion, but using the object oriented paradigm. The stub-code generation process ensures that a mapping to one of several programming languages is achieved and in the following sections, there is a brief description of how such a mapping in C++ can be performed. Referring to FIG. 9, there is illustrated a way in which an interface specification 161 employs the stub-generation tool 162 in connection with a set of generated files 164 in the system of the present invention. FIG. 9 illustrates, in particular, the overall structure of the C++ mapping as implemented in that language. An interface specification, written in the object-oriented interface description language ELIN as used in the system of the present invention, is similar to a class definition used in the programming language C++. Likewise, the mechanism for accessing operations through objects is similar to the manner in which the programming language C++ handles virtual functions. Therefore, the mapping on C++ illustrated in FIG. 9 is instructive as to the operation of this aspect of the system of the present invention.

The stub-generation tool 162 generates two files for both the client side and the server side, one with the suffix ".h" (header) and one with the suffix ".cc" (code). For the client, the ".h" or header file contains two class definitions. One class is an exact copy of the corresponding class in the server's ".h" or header file. This assures compatibility between the client and server and makes it possible for the client to call objects created by the server. This class' constructor is private, however, so that the class cannot be used to create automatic objects on the stack. The second class is the one to be used at the client that acts as an agent through which objects created by the server can be accessed.

For the server side, the same two ".h" (header) and ".cc" (code) files are generated by the stub-generation tool 162. The contents of the ".h" file consists of one class definition that will ensure compatibility with the client. This is the class that is used as a base for implementation. The implementation can be based directly on the generated class or the generated class can be used as a base from which to derive other classes. The ".cc" file contains a skeleton for the "createmethod" and code that performs the publication of the address of the createmethod. The body of the createmethod is responsible for creating an object that is compatible with the generated class and returning a pointer to the newly created object as also illustrated in FIG. 6.

There are several reasons for generating differing yet compatible class definitions for the client and server sides rather than one shared class definition. First, it provides different levels of visibility for members in the client and the server. For example, a constructor must be public in the server but should not necessarily be public if it resides in the client. Second, the client and server programs can be linked together for test purposes without encountering the problem of name collisions if different classes are used.

Referring next to FIG. 10, there is shown a certain arrangement of charts illustrating certain exemplary code blocks and their relationship to one another as employed in the system of the present invention. FIG. 10 illustrates the logical structure of certain generated files and written specifications as they might be implemented in the system of the present invention. At the highest level, the Common Interface Specification 171 defines a Class "X" and the methods for which the class will accept calls. Logically subordinate to this Class, at the next level of definition is a specification for a user unit 172 of the Interface Specification 171 and a specification for a provider unit 173 of the Common Interface Specification 171. The user unit specification 172 defines a client of the common interface, Class X. The provider unit specification 173 defines a server of Class X.

At the next logical level below the unit specifications 172 and 173 are the generated class definitions for users and providers respectively. The generated class definition for XUser 174 illustrates certain user classes defined for both public and private use. The generated class definition for XProvider 175 illustrates certain public and private definitions for provider data and functions.

Figure 11:
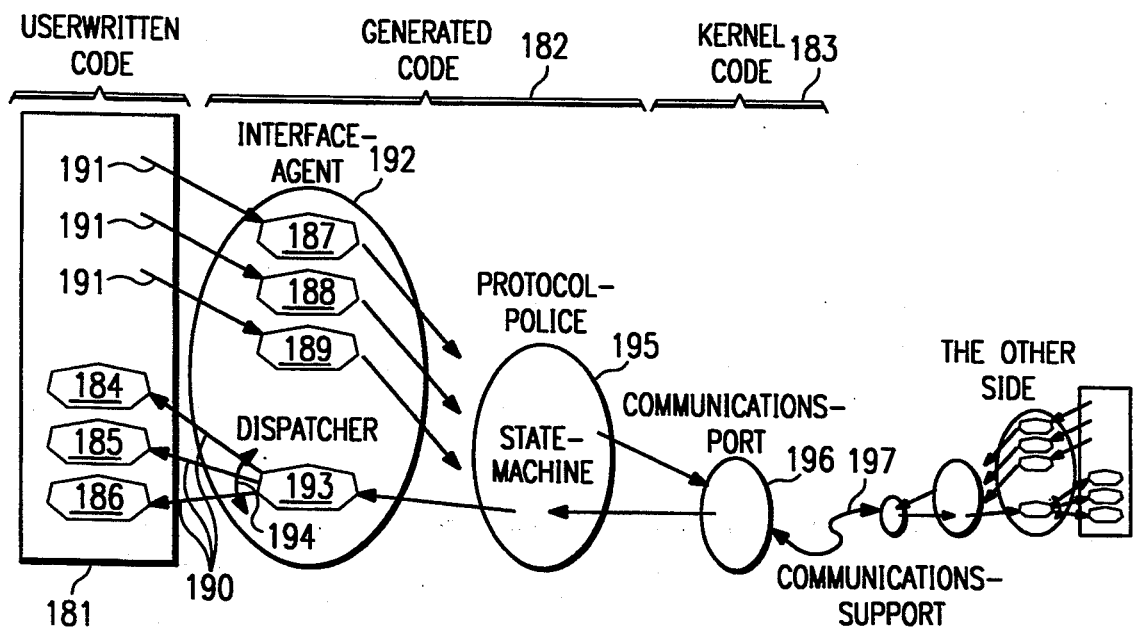
FIG. 11 is an illustrative diagram of the manner in which certain protocols facilitate interfaces within the system of the present invention.

Referring finally to FIG. 11, there is shown an illustrative diagram of how a protocol specification is used for generation of stub-code, which assures perfect coordination between two communicating parties using messages. The structure of the stub-code is illustrated in FIG. 11 and includes User-written code 181, Generated Code 182 and Kernel Code 183. In distributed and modular computer systems, an example of which is a telecommunications system, many application level protocols are utilized to facilitate communications in and among portions of the system.

Protocols can be viewed as a collection of contracts between pairs of parties within the system who agree to communicate in a particular manner and format. Some protocols can be described as client-server protocols wherein only one party is an initiator. Other protocols, called peer protocols, allow both parties to initiate communications. In the system of the present invention, unlike other existing systems, the entire agreement or protocol between parties is specified in a single interface specification that is separate from the specific implementations of the parties. This implies, therefore, that this single specification can serve as a generic agreement that can be reused for agreements between any pair of parties within the system.

The system of the present invention implements the single interface/protocol specification in a proprietary object-oriented interface description language ELIN. The specification of peer type protocols, for example, includes the following components: (1) a formal grouping of operations into protocols, each protocol having two parties; and (2) a specification of interaction constraints. The peer protocol specification exists separately from the implementations that use the protocol to execute their communications. The peer protocol specification is organized according to the following format: (1) Protocol Name; (2) 1st Party's Name and its Accepted Operations List; (3) 2nd Party's Name and its Accepted Operations List; (4) Interaction Constraints (Optional).

Set forth below, in code, is an example of a protocol specification with interaction constraints. The information included in such a protocol specification may be used for the generation of stubcode:

```
PROTOCOL Communication Service;
    PARTY DataProducer;
        ACCEPTS
            StartTransmission,
TerminateTransmission,    ReSendData
        END PARTY DataProducer
    PARTY DataConsumer
        ACCEPTS
            StringData,    IntegerData,
NoMoreDataToSend
        END PARTY DataConsumer;
    INTERACTION
        STATE START
            WHEN StartTransmission THEN Started;
        STATE Started
            WHEN TerminateTransmission THEN START;
            WHEN IntegerData THEN Dataphase;
            WHEN StringData THEN Dataphase;
        STATE Dataphase
            WHEN IntegerData THEN Dataphase;
            WHEN StringData THEN Dataphase;
            WHEN ResendData THEN Dataphase;
            WHEN    NoMoreDataToSend    THEN
Dataphase    Ended;
        STATE DataphaseEnded
            WHEN ResendData THEN ResendOrdered;
            WHEN TerminateTransmission THEN START;
        STATE ResendOrdered
            WHEN StringData THEN DataphaseEnded;
            WHEN IntegerData THEN DataphaseEnded;
    END PROTOCOL CommunicationService;
```

© Telefonaktiebolaget L M Ericsson

The logical structure of a party communicating within the system is also illustrated in FIG. 11. As illustrated in FIG. 11, the language, ELIN, is used to describe communications between objects distributed across the system, as well as data types utilized within the system. The protocols used and defined in this aspect of the present invention allow devices to act as equals, with either party initiating communications. Parties are not pre-defined as either a master or slave for communications purposes. This aspect of the system of the present invention allows systems that are developed and operated in different and distant places to easily interoperate, so long as each is developed using the single specified interfaces. The protocol specifications of this aspect of the system of the present invention are separate and distinct from any applications implementation within the system.

As further illustrated in FIG. 11, the User-written code 181 acts as one party in the communications protocol that may both send and receive messages according to the protocol specification. The data receiving procedures 184, 185 and 186 handle incoming messages arriving in the protocol. The data sending procedures 187, 188, 189 comprise code automatically generated by the stubgeneration tool to create and send messages out into the system in accordance with the protocol specification when they are called by the user. The actions of receiving the messages 190 and of sending the messages 191 are all directed through an interface agent 192, that is part of the Generated code 182. This interface specification 192 is the mandatory portion of the generated code and must be present for the interface and the protocols to function properly.

The dispatcher 193 is a function that is generated by the stubgeneration tool and that is called for each incoming message which is specified in the protocol specification. The dispatcher 193 receives the message, decodes the message, separates the message identifier from the body of the message and then distributes it as illustrated at 194 to the procedure to be written in this implementation.

The protocol police 195, an optional portion of the Generated code 182, serves to supervise traffic and to determine whether the two communicating parties at any given instance are abiding by the interface rules in sending or receiving messages. The protocol police 195 operates as a state machine in supervising obedience to the protocol rules. The logic of the state machine is expressed in the exemplary code provided above.

In the Kernel code 183, as illustrated in FIG. 11, resides a communications port 196. This communications port 196 is viewed by the addressing mechanisms of the system of the present invention as a passive support means. The communications port 196 is unaware of the protocol that is being passed through it, but serves to facilitate the communications. The communications support 197 is the general communications support that exists within the operating system. It can operate between processes in the same processor or processes located on different processors. If it is operating at objects distributed between processors, the communications support 197 would constitute a hardware communications link. The mirror image of the entire illustration contained in FIG. 11 would represent the corresponding activities that occur in the support and operation of a second communicating party within the system.

As illustrated above, the system of the present invention enables the runtime inclusion or linking of new software with old software in a manner that enables software to be both effectively tested in real-time as well as to be smoothly and transparently substituted in a telecommunications network and switching system without disruption of the telecommunications traffic within the network.

It is thus believed that the operation and construction of the present invention will be apparent from the foregoing description. While the method, apparatus and system shown and described has been characterized as being preferred, it will be readily apparent that various changes and modifications can be made therein without departing from the spirit and scope of the invention as defined in the following claims.

What is claimed is:

1. For use in conjunction with computer apparatus, while it is processing existing data with existing software and receiving new data to be processed, a method of automatically passing data processing control of the computer apparatus to new software without materially disrupting the processing of the existing data by the existing software while allowing both software versions to generate output data simultaneously, said method comprising the steps of:

installing the new software in the computer apparatus;

using the new software to process test data at the same time as both the existing and new actual data are being processed by the existing software;

automatically transferring processing control of all new data to the new software subsequent to its successful processing of said test data while continuing to use the existing software to process existing data and generating output data from both the new and old software simultaneously; and automatically transferring complete data processing control to the new software subsequent to its successful processing of said new data.

2. The method as set forth in claim 1 wherein both existing data and new data are processed in a plurality of parallel, independent simultaneous transactions which transactions are dynamically directed to either the existing or new software version by the steps of:

associating with each transaction a flag indicating the mode of the transaction; and dynamically directing the entirety of each transaction to either the new or the existing software version in accordance with the mode identified by the associated flag.

3. The method as set forth in claim 2 wherein a flag indicative of a test mode is associated with all transactions based upon test data input to the system and all transactions having a test flag associated therewith are directed to the new software for the entirety of the processing thereof.

4. The method as set forth in claim 2 wherein a flag indicative of an existing data mode is associated with all transactions based upon all actual data input to the system prior to the input of new data to the new software and all transactions having an existing data flag associated therewith are directed to the existing software for the entirety of the processing thereof.

5. For use in conjunction with computer apparatus, while it is processing existing data with existing software and receiving new data to be processed, a method of automatically passing data processing control of the computer apparatus to new software without materially disrupting the processing of the existing data by the existing software, said method comprising the steps of:

installing the new software in the computer apparatus;

using the new software to process test data simulating the actual data being processed by the existing software;

permitting the new software, in response to its successfully processing the test data, to process a sample portion of the actual data which would otherwise be processed by the old software; and transferring complete data processing control to the new software subsequent to its successful processing of said predetermined sample portion of the actual data.

6. The method as set forth in claim 5 further comprising the step, performed between said permitting and automatically transferring steps, of:

processing all new data with the new software while the existing software processes the existing data.

7. The method as set forth in claim 6 wherein:

said automatically transferring step is performed in response to the expiration of a preselected time period following the beginning of said step of processing all new data within the new software while the existing software processes the existing data.

8. The method as set forth in claim 7 wherein, after the expiration of said preselected time period, all transactions still being processed using old software are forced to terminate.

9. The method as set forth in claim 7 wherein, after the expiration of said preselected time period, all transactions still being processed using old software are transferred to the new software for completion of processing.

10. The method as set forth in claim 7 wherein, after the expiration of said preselected time period, all transactions capable of surviving the resultant disturbance are attempted to be transferred to the new software for processing and all others are terminated.

11. The method as set forth in claim 6 wherein:

said automatically transferring step is performed subsequent to the completion of processing of the existing data by the existing software.

12. The method as set forth in claim 11 wherein:

said automatically transferring step is performed in response to the successful processing of all new data by the new software and the completion of processing of the existing data by the existing software.

13. For use in conjunction with computer apparatus, while it is processing existing data with existing software and receiving new data to be processed wherein both existing data and new data are processed in a series of transactions and both include dynamic data which is created and used during the processing of each transaction and deleted when the processing is complete and semipermanent data which is used by and survives the processing of a plurality of transactions, a method of automatically passing data processing control of the computer apparatus to new software without materially disrupting the processing of the existing data by the existing software, said method comprising the steps of:

installing the new software in the computer apparatus;

transferring data from the existing software to the new software;

using the new software to process test data simulating the actual data being processed by the existing software; and automatically transferring complete data processing control to the new software subsequent to its successful processing of said test data simulating the actual data.

14. The method as set forth in claim 13 wherein the data representation in the new software is different from the data representation in the existing software and wherein said step of transferring data from the existing software to the new software includes the step of:

converting said data from said existing representation to said new representation.

15. The method as set forth in claim 14 wherein:

said step of converting said data from said existing representation to said new representation is performed on an as needed basis for said new software.

16. The method as set forth in claim 14 wherein:

said step of converting said data from said existing representation to said new representation includes converting all said data to said new representation at one time along with the additional step of:

reconverting said data from said new representation to said existing representation on an as needed basis for said old software.

17. The method as set forth in claim 14 which includes, following said step of converting said data from the existing representation to the new representation, the additional step of:

updating, in response to each original update of semipermanent data within either the existing software or the new software, the semipermanent data within the other software.

18. The method as set forth in claim 13 wherein:

only semipermanent data is transferred from the existing software to the new software.

19. The method as set forth in claim 13 which includes, following said step of transferring data from the existing software to the new software, the additional step of:

updating, in response to each original update of semipermanent data within either the existing software or the new software, the semipermanent data within the other software.

20. A method of smoothly and automatically changing from old call processing software to new call processing software in a telecommunications switching system, during continuing operation thereof, without a material risk of system disruption and while simultaneously producing output data from both old and new call processing software, said method comprising the steps of:

operatively installing the new software in the system while the old software continues to process calls;

running a plurality of test calls through the system and routing all said test calls to the new software for processing thereby while simultaneously processing actual calls with the old software;

routing all of the new calls received by the system to the new software in response to the new software successfully processing said test calls while simultaneously processing all of the existing calls with the old software and simultaneously producing output data from both the old and the new software; and routing all of the new calls received by the system to the old software in response to the new software failing to successfully process said test calls.

21. The method as set forth in claim 20 wherein both old data and new call transactions are processed in a plurality of parallel, independent simultaneous transactions which transactions are dynamically directed to either the old or new call processing software by the steps of:

associating with each call transaction a flag indicating the mode of the transaction; and dynamically directing the entirety of each transaction to either the new or the old call processing software in accordance with the mode identified by the associated flag.

22. The method as set forth in claim 21 wherein a flag indicative of a test call mode is associated with all transactions based upon test calls input to the system and all transactions having a test flag associated therewith are directed to the new software for the entirety of the processing thereof.

23. The method as set forth in claim 21 wherein a flag indicative of an existing call mode is associated with all transactions based upon all actual calls input to the system prior to the routing of new calls to the new software and all call transactions having an existing call flag associated therewith are directed to the old software for the entirety of the processing thereof.

24. A method of smoothly and automatically changing from old call processing software to new call processing software in a telecommunications switching system, during continuing operation thereof, without a material risk of system disruption, said method comprising the steps of:

operatively installing the new software in the system while the old software continues to process calls;

running a plurality of test calls through the system and routing all said test calls to the new software for processing thereby;

routing a selected number of actual calls to the new software for processing thereby, in response to said test calls being successfully processed by the new software, while continuing to process the remainder of the actual calls with the old software;

routing all of the new calls received by the system to the new software in response to the new software successfully processing both said test calls and said selected number of actual calls; and routing all of the new calls received by the system to the old software in response to the new software failing to successfully process either said test calls or said selected number of actual calls.

25. The method as set forth in either claims 20 or 24 which also includes the step of:

removing the old software from the system in response to successful processing of all of the new calls by the new software, and a termination of all calls being processed by the old software.

26. The method as set forth in claim 24 comprising the step, performed after said step of routing all new calls received by the system to the new software, of:

processing all new calls with the new software while the old software processes the existing calls.

27. The method as set forth in claim 26 which includes the additional step of:

transferring complete call processing control to the new software in response to the expiration of a preselected time period following the beginning of said step of processing all new calls within the new software while the old software processes the existing calls.

28. The method as set forth in claim 27 wherein, after the expiration of said preselected period of time, all calls still being processed using old software are forced to terminate.

29. The method as set forth in claim 27 wherein, after expiration of said preselected period of time, all calls still being processed are transferred to the new software for completion of processing.

30. The method as set forth in claim 27 wherein, after the expiration of said preselected period of time, all calls capable of surviving the resultant disturbance are attempted to be transferred to the new software and all others are terminated.

31. A method of smoothly and automatically changing from old call processing software to new call processing software in a telecommunications switching system, during continuing operation thereof, without a material risk of system disruption, and wherein both existing calls and new calls are processed in a series of transactions and both have associated therewith dynamic data which is created and used during the processing of each transaction and deleted when the processing is complete and semipermanent data which is used by and survives the processing of a plurality of transactions, said method comprising the steps of:

operatively installing the new software in the system while the old software continues to process calls;

transferring data from the old software to the new software;

running a plurality of test calls through the system and routing all said test calls to the new software for processing thereby;

routing all of the new calls received by the system to the new software in response to the new software successfully processing said test calls; and routing all of the new calls received by the system to the old software in response to the new software failing to successfully process said test calls.

32. The method as set forth in claim 31 wherein the data representation in the new software is different from the data representation in the old software and wherein said step of transferring data from the old software to the new software includes the step of:

converting said data from said old representation to said new representation.

33. The method as set forth in claim 32 wherein said step of converting said data from said existing representation to said new representation is performed on an as needed basis for said new software.

34. The method as set forth in claim 32 wherein said step of converting said data from said existing representation to said new representation includes converting all said data to said new representation at one time along with the additional step of:

reconverting said data from said new representation to said existing representation on an as needed basis for said old software.

35. The method as set forth in claim 32 which includes, following said step of converting said data from the old representation to the new representation, the additional step of:

updating, in response to each original update of semipermanent data within either the old software or the new software, the semipermanent data within the other software.

36. The method as set forth in claim 31 wherein:

only semipermanent data is transferred from the old software to the new software.

37. The method as set forth in claim 31 which includes, following said step of transferring data from the old software to the new software, the additional step of:

updating, in response to each original update of semipermanent data within either the old software or the new software, the semipermanent data within the other software.

38. A method of smoothly and automatically changing from old call processing software to new call processing software in a telecommunications switching system, during continuing operation thereof and while allowing both old and new call processing software to generate output data simultaneously, said method comprising the steps of:

operatively installing the new software in the system while the old software continues to process calls;

running a plurality of test calls to the system and routing all said test calls to the new software for processing thereby, without halting all actual telecommunications traffic to the old software;

routing all of the new calls received by the system to the new software in response to the new software successfully processing said test calls and simultaneously producing output data from both the old and the new software; and removing all old software from the system in response to successful processing of all of the new calls by the new software, and the first to occur of the termination of all calls being processed by the old software or the expiration of a preselected period of time following the routing of all the new calls received by the system to the new software.

39. The method as set forth in claim 38 wherein, after the expiration of said preselected time period, all transactions still being processed using old software are forced to terminate.

40. The method as set forth in claim 38 wherein, after the expiration of said preselected time period, all transactions still being processed using old software are transferred to the new software for completion of processing.

41. The method as set forth in claim 38 wherein, after the expiration of said preselected time period, all transactions capable of surviving the resultant disturbance are attempted to be transferred to the new software for processing and all others are terminated.

42. A method of smoothly and automatically changing from old call processing software to new call processing software in a telecommunications switching system, during continuing operation thereof, said method comprising the steps of:

operatively installing the new software in the system while the old software continues to process calls;

running a plurality of test calls to the system and routing all said test calls to the new software for processing thereby, without halting all actual telecommunications traffic to the software by the steps of:

routing only simulated calls to the new software for processing thereby; and routing a number of sample new calls, in addition to said simulated calls, to the new software for processing thereby, in response to said simulated calls being successfully processed by the new software;

routing all of the new calls received by the system to the new software in response to the new software successfully processing said test calls; and removing all old software from the system in response to successful processing of all of the new calls by the new software, and the first to occur of the termination of all calls being processed by the old software or the expiration of a preselected period of time following the routing of all the new calls received by the system to the new software.

43. A method of smoothly and automatically changing from old call processing software to new call processing software in a telecommunications switching system, during continuing operation thereof, wherein both existing calls and new calls are processed in a series of transactions and both have associated therewith dynamic data which is created and used during the processing of each transaction and deleted when the processing is complete and semipermanent data which is used by and survives the processing of a plurality of transactions, said method comprising:

operatively installing the new software in the system while the old software continues to process calls;

transferring data from the old software to the new software;

running a plurality of test calls to the system and routing all said test calls to the new software for processing thereby, without halting all actual telecommunications traffic to the old software;

routing all of the new calls received by the system to the new software in response to the new software successfully processing said test calls; and removing all old software from the system in response to successful processing of all of the new calls by the new software, and the first to occur of the termination of all calls being processed by the old software or the expiration of a preselected period of time following the routing of all the new calls received by the system to the new software.

44. The method as set forth in claim 43 wherein the data representation in the new software is different from the data representation in the old software and wherein said step of transferring data from the old software to the new software includes the step of:

converting said data from said old representation to said new representation.

45. The method as set forth in claim 44 wherein, said step of converting said data from said old representation to said new representation is performed on an as needed basis for said new software.

46. The method as set forth in claim 44 wherein, said step of converting said data from said old representation to said new representation includes converting all said data to said new representation at one time along with the additional step of:

reconverting said data from said new representation to said existing representation on an as needed basis for said old software.

47. The method as set forth in claim 44 which includes, following said step of converting said data from the old representation to the new representation, the additional step of:

updating, in response to each original update of semipermanent data within either the old software or the new software, the semipermanent data within the other software.

48. The method as set forth in claim 43 wherein:

only semipermanent data is transferred from the old software to the new software.

49. The method as set forth in claim 43 which includes, following said step of transferring data from the old software to the new software, the additional step of:

updating, in response to each original update of semipermanent data within either the old software or the new software, the semipermanent data within the other software.

50. A method for automatically shifting data processing operations from previously loaded first software to newly loaded second software in a computer system in which the first software is processing existing data while new data is being received by the computer system and both the first and second software are producing output data simultaneously, said method comprising the steps of:
- transmitting test data to said second software for processing thereby, said test data simulating actual data to be processed;
- transmitting all of said new data to said second software during continued processing of said existing data by said first software in response to a successful processing of said test data by said second software and while both said first and second software generate output data simultaneously; and
- routing all other data to said second software for processing thereby in response to the completion of processing of said existing data by said first software, to automatically effect the changeover from said first software to said second software during computer system runtime without materially disrupting the continuance of data processing operations.

51. A method for automatically shifting data processing operations from previously loaded first software to newly loaded second software in a computer system in which the first software is processing existing data while new data is being received by the computer system, said method comprising the steps of:
- transmitting test data to said second software for processing thereby, said test data simulating actual data to be processed by said first software;
- transmitting to said second software a predetermined, limited sample amount of actual data which would otherwise be processed by said first software, in response to a successful processing of said test data by said second software;
- transmitting all of said new data to said second software during continued processing of said existing data by said first software in response to a successful processing of said test data by said second software in response to a successful processing of both said test data and said limited sample of actual data by said second software; and
- routing all other data to said second software for processing thereby in response to the completion of processing of said existing data by said first software, to automatically effect the changeover from said first software to said second software during computer system runtime without materially disrupting the continuance of data processing operations.

52. The method as set forth in claim 50 or 51 wherein:
- said computer system is a telecommunications switching system; and
- said existing and new data are calls received by said telecommunications switching system.

53. For use in conjunction with a telecommunications switching system in which existing calls are being processed by previously installed first software while new calls are being received by the system, a method for gradually redirecting calls to subsequently installed second software, for processing thereby, during switching system runtime and without a material disruption of continued call processing, said method comprising:
- transmitting to said second software test calls simulative of actual calls processed by said first software while at the same time both existing and new actual calls are being processed by said first software;
- transmitting to said second software all of the new calls received by the telecommunications switching system during continued processing of said existing calls by said first software with output data being simultaneously produced by both said first and second software;
- sequentially performing said first and second steps and sequentially subjecting said second software to:
  (1) a first call processing test using test calls transmitted to said second software in said first step, and
  (2) a second call processing test, contingent on the successful completion of said first call processing test by said second software, using the new calls transmitted to said second software in said second step; and
- transferring all call processing control from said first software to said second software subsequent to the successful completion of said second call processing test by said second software.

54. For use in conjunction with a telecommunications switching system in which existing calls are being processed by previously installed first software while new calls are being received by the system, a method for gradually redirecting calls to subsequently installed second software, for processing thereby, during switching system runtime and without a material disruption of continued call processing, said method comprising:
- transmitting to said second software test calls simulative of actual calls processed by said first software;
- transmitting to said second software a sample amount of actual calls which would otherwise be processed by said first software;
- transmitting to said second software all of the new calls received by the telecommunications switching system;
- sequentially performing said first, second and third steps and sequentially subjecting said second software to:
  (1) a first call processing test using test calls transmitted to said second software in said first step,
  (2) a second call processing test, contingent on the successful completion of said first call processing test by said second software, using the sample amount of actual calls transmitted to said second software in said second step; and
  (3) a third call processing test, contingent on the successful completion of said first and second call processing tests by said second software, using the new calls transmitted to said second software in said third step; and
- transferring all call processing control from said first software to said second software subsequent to the successful completion of said third call processing test by said second software.

55. The method as set forth in claim 53 or 54 wherein: said step of transferring all call processing control from said first software to said second software is performed following:
  (1) the successful completion of said second call processing test by said second software, and
  (2) the completion of existing call processing by said first software.

56. The method as set forth in claim 53 or 54 wherein: said step of transferring all call processing control from said first software to said second software is performed following:
  (1) the successful completion of said second call processing test by said second software, and (2) the expiration of a preselected period of time following the transmission of said second software all of the new calls received by the telecommunications switching system.

57. The method as set forth in claim 56 wherein, after the expiration of said preselected time period, all transactions still being processed using said first software are forced to terminate.

58. The method as set forth in claim 56 wherein, after the expiration of said preselected time period, all transactions still being processed using said first software are transferred to the second software for completion of processing.

59. The method as set forth in claim 56 wherein, after the expiration of said preselected time period, all transactions capable of surviving the resultant disturbance are attempted to be transferred to said second software and all others are terminated.

60. A method of dynamically binding first and second modules respectively disposed in first and second software applications by providing a set of direction points for dynamically directing chains of events within the operational software system to either one or the other of said first or second applications, said method comprising the steps of:
   analyzing messages addressed by function name;
   directing those messages to processes in each of said first or second modules; and
   directing the execution of a process by dynamic runtime binding to selectively continue the execution of said process in either one of said first or said second software modules.

61. Apparatus for automatically shifting data processing operations from previously loaded first software to newly loaded second software in a computer system in which the first software is processing existing data while new data is being received by the computer system, said apparatus comprising:
   first means for transmitting test data to said second software for processing thereby, said test data simulating actual data to be processed by said first software, while at the same time both existing and new actual data are being processed by said first software;
   second means, responsive to a successful processing of said test data by said second software, for transmitting all of said new data to said second software during continued processing of said existing data by said first software and the simultaneous production of output data from both said first and second software; and
   third means, responsive to the first to occur of the completion of processing of said existing data by said first software or the expiration of a preselected period of time following the beginning of transmission of all of said new data to said second software, for discontinuing further use of said first software for processing data, whereby the changeover from said first software to said second software may be automatically effected during computer system runtime without materially disrupting the continuance of data processing operations thereof.

62. Apparatus for automatically shifting data processing operations from previously loaded first software to newly loaded second software in a computer system in which the first software is processing existing data while new data is being received by the computer system, said apparatus comprising:
   first means for transmitting test data to said second software for processing thereby, said test data simulating actual data to be processed by said first software;
   second means, responsive to a successful processing of said test data by said second software, for transmitting all of said new data to said second software during continued processing of said existing data by said first software; and
   third means, responsive to the firs to occur of the completing of processing of said existing data by said first software or the expiration of a preselected period of time following the beginning of transmission of all of said new data to said second software;
   fourth means, responsive to a successful processing of said test data by said second software, for transmitting to said second software a predetermined limited sample of actual data which would otherwise be processed by said first software; and in which
   said second means for transmitting all of said new data to said second software is responsive to a successful processing of both said test data and said sample amount of actual data by said second software, for discontinuing further use of said first software for processing data, whereby the changeover from said first software to said second software may be automatically effected during computer system runtime without materially disrupting the continuance of data processing operations thereof.

63. The apparatus as set forth in claim 61 or 62 wherein:
   said computer system is a telecommunications switching system; and
   said existing and new data are calls received by said telecommunications switching system.

64. For use in conjunction with a telecommunications switching system in which existing calls are being processed by previously installed first software while new calls are being received by the system, automatically operable apparatus for gradually redirecting calls to subsequently installed second software, for processing thereby, during switching system runtime and without a material disruption of continued call processing, said automatically operable apparatus comprising:
   first means operable to transmit to said second software test calls simulative of actual calls processed by said first software while at the same time both existing and new actual calls are being processed by said first software;
   second means operable to transmit to said second software all of the new calls received by the telecommunications switching system during continued processing of existing calls by said first software with output data being simultaneously produced by both said first and second software;
   third means for sequentially operating said first and second means and sequentially subjecting said second software to:
   (1) a first call processing test using test calls transmitted to said second software from said first means, and
   (2) a second call processing test, contingent on the successful completion of said first call processing test by said second software, using the new calls transmitted to said second software by said second means; and fourth means for transferring all call processing control from said first software to said second software subsequent to the successful completion of said second call processing test by said second software.

65. For use in conjunction with a telecommunications switching system in which existing calls are being processed by previously installed first software while new calls are being received by the system, automatically operable apparatus for gradually redirecting calls to subsequently installed second software, for processing thereby, during switching system runtime and without a material disruption of continued call processing, said automatically operable apparatus comprising:

first means operable to transmit to said second software test calls simulative of actual calls processed by said first software;

second means operable to transmit to said second software all of the new calls received by the telecommunications switching system;

third means for sequentially operating said first and second means and sequentially subjecting said second software to:
(1) a first call processing test using test calls transmitted to said second software from said first means, and
(2) a second call processing test, contingent on the successful completion of said first call processing test by said second software, using the new calls transmitted to said second software by said second means; and fourth means for transferring all call processing control from said first software to said second software subsequent to the successful completion of said second call processing test by said second software;

fifth means operable to transmit to said second software a sample amount of actual calls which would otherwise be processed by said first software; and in which, said third means sequentially operates said first, second and fifth means to sequentially subject said second software to an additional call processing test, contingent upon the successful completion of said first call processing test by said second software, using said sample amount of actual calls transmitted to said second software by said fifth means, and in which said second call processing test is contingent upon the successful completion of both said first and additional call processing tests by said second software.

66. The automatically operable apparatus as set forth in claim 64 or claim 65 wherein:
said fourth means are operative in response to:
(1) the successful completion of said second call processing test by said second software, and
(2) the completion of existing call processing by said first software.

67. For use in conjunction with computer apparatus, while it is processing existing data with existing software and receiving new data to be processed, a system for automatically passing the computer apparatus data processing control to new software without materially disrupting the processing of the existing data by the existing software while allowing both software versions to generate output data simultaneously, said system comprising:

means for installing the new software in the computer apparatus;

means for using the new software to process test data at the same time as the both new and existing actual data are being processed by the existing software;

means for automatically transferring processing control of all new data to the new software subsequent to its successful processing of said test data while continuing to use the existing software to process existing data and generating output data from both the new and old software simultaneously; and means for automatically transferring complete data processing control to the new software subsequent to its successful processing of said new data.

68. The system set forth in claim 67 wherein:
said means for automatically transferring is responsive to the first to occur of the expiration of a preselected time period following the beginning of said processing all new data with the new software while the existing software processes the existing data or the completion of processing of the existing data by the existing software.

69. The system set forth in claim 68 wherein, after the expiration of said preselected time period, all transactions still being processed using old software are forced to terminate.

70. The system set forth in claim 68 wherein, after the expiration of said preselected time period, all transactions still being processed using old software are transferred to the new software for completion of processing.

71. The system set forth in claim 68 wherein, after the expiration of said preselected time period, all transactions capable of surviving the resultant disturbance are attempted to be transferred to the new software for processing and all others are terminated.

72. The system as set forth in claim 67 wherein both existing data and new data are processed in a plurality of parallel, independent simultaneous transactions which transactions are dynamically directed to either the existing or new software version and which also includes:
means for associating with each transaction a flag indicating the mode of the transaction; and
means for dynamically directing the entirety of each transaction to either the new or the existing software version in accordance with the mode identified by the associated flag.

73. The system as set forth in claim 72 wherein a flag indicative of a test mode is associated with all transactions based upon test data input to the system and all transactions having a test flag associated therewith are directed to the new software for the entirety of the processing thereof.

74. The system as set forth in claim 72 wherein a flag indicative of an existing data mode is associated with all transactions based upon all actual data input to the system prior to the input of new data to the new software and all transactions having an existing data flag associated therewith are directed to the existing software for the entirety of the processing thereof.

75. For use in conjunction with computer apparatus, while it is processing existing data with existing software and receiving new data to be processed, a system for automatically passing the computer apparatus data processing control to new software without materially disrupting the processing of the existing data by the existing software, said system comprising:

means for installing the new software in the computer apparatus;

means for using the new software to process test data simulating the actual data being processed by the existing software;

means for automatically transferring complete data processing control to the new software subsequent to its successful processing of said test data;

means for permitting the new software, in response to its successful processing of the test data, to process a sample portion of the actual data which would otherwise be processed by the old software, and in which, said means for automatically transferring complete data processing control to the new software is operative subsequent to the successful processing of both said test data and said predetermined sample portion of the actual data.

76. The system as set forth in claim 75 wherein:
said means for automatically transferring is initiated subsequent to the completion of processing of the existing data by the existing software.

77. The system as set forth in claim 76 wherein:
said means for automatically transferring is responsive to the successful processing of all new data by the new software and the completion of processing of the existing data by the existing software.

78. For use in conjunction with computer apparatus, while it is processing existing data with existing software and receiving new data to be processed, a system for automatically passing the computer apparatus data processing control to new software without materially disrupting the processing of the existing data by the existing software comprising:

means for installing the new software in the computer apparatus;

means for transferring data from the existing software to the new software;

means for using the new software to process test data simulating the actual data being processed by the existing software; and means for automatically transferring complete data processing control to the new software subsequent to its successful processing of said test data.

79. The system set forth in claim 78 wherein the data representation in the new software is different from the data representation in the existing software and wherein said means for transferring data from the existing software to the new software includes:

means for converting said data from said existing representation to said new representation.

80. The system as set forth in claim 79 wherein, said means for converting said data from said existing representation to said new representation includes means for converting said data on an as needed basis for said new software.

81. The system as set forth in claim 79 wherein,
said means for converting said data from said existing representation to said new representation includes means for converting all said data to said new representation at one time along with, means for reconverting said data from said new representation to said existing representation on an as needed basis for said existing software.

82. The system set forth in claim 79 which also includes:

means for updating, in response to each original update of semipermanent data within either the existing software or the new software, the semipermanent data within the other software.

83. The system set forth in claim 78 wherein:
only semipermanent data is transferred from the existing software to the new software.

84. The system set forth in claim 78 which also includes:

means for updating, in response to each original update of semipermanent data within either the existing software or the new software, the semipermanent data within the other software.

85. A system for smoothly and automatically changing from old call processing software to new call processing software in a telecommunications switching system, during continuing operation thereof, without a material risk of system disruption and while simultaneously producing output data from both old and new processing software, said system comprising:

means for operatively installing the new software in the system while the old software continues to process calls;

means for running a plurality of test calls through the system and routing all said test calls to the new software for processing thereby while simultaneously processing actual calls with the old software;

means for routing all of the new calls received by the system to the new software in response to the new software successfully processing said test calls while simultaneously processing all of the existing calls with the old software and simultaneously producing output data from both the old and new software; and means for removing the old software from the system in response to successful processing of all of the new calls by the new software, and a termination of all calls being processed by the old software.

86. A system for smoothly and automatically changing from old call processing software to new call processing software in a telecommunications switching system, during continuing operation thereof, without a material risk of system disruption, said system comprising;

means for operatively installing the new software in the system while the old software continues to process calls;

means for running a plurality of test calls through the system and routing all said test calls to the new software for processing thereby;

means for routing a selected number of actual calls to the new software for processing thereby, in response to said test calls being successfully processed by the new software, while continuing to process the remainder of the actual calls with the old software;

means for routing all of the new calls received by the system to the new software in response to the new software successfully processing both said test calls and said selected number of actual calls; and means for removing the old software from the system in response to successful processing of all of the new calls by the new software, and a termination of all calls being processed by the old software.

87. A system for smoothly and automatically changing from old call processing software to new call processing software in a telecommunications switching system, during continuing operation thereof, without a material risk of system disruption, and wherein both existing calls and new calls are processed in a series of transactions and both have associated therein dynamic data which is created and used during the processing of each transaction and deleted when the processing is complete and semipermanent data which is used by and survives the processing of a plurality of transactions, said system comprising:
- means for operatively installing the new software in the system while the old software continues to process calls;
- means for transferring data from the old software to the new software;
- means for running a plurality of test calls through the system and routing all said test calls to the new software for processing thereby:
- means for routing all of the new calls received by the system to the new software in response to the new software successfully processing said test calls; and
- means for removing the old software from the system in response to successful processing of all of the new calls by the new software, and a termination of all calls being processed by the old software.

88. The system set forth in claim 87 wherein the data representation in the new software is different from the data representation in the old software and said means for transferring data from the old software to the new software includes:
- means for converting said data from said old representation to said new representation.

89. The system as set forth in claim 88 in which said means for converting said data from said old representation to said new representation includes:
- means for converting said data from said old representation to said new representation on an as needed basis for said new software.

90. The system as set forth in claim 88 in which said means for converting said data from said old representation to said new representation includes means for converting all said data to said new representation at one time and also includes,
- means for reconverting said data from said new representation to said old representation on an as needed basis for said old software.

91. The system set forth in claim 88 which also includes:
- means for updating, in response to each original update of semipermanent data within either the old software or the new software, the semipermanent data within the other software.

92. The system set forth in claim 87 wherein:
- only semipermanent data is transferred from the old software to the new software.

93. The system set forth in claim 87 which also includes:
- means for updating, in response to each original update of semipermanent data within either the old software or the new software, the semipermanent data within the other software.

94. A system for smoothly and automatically changing from old call processing software to new call processing software in a telecommunications switching system during continuing operation thereof, said system comprising:
- means for operatively installing the new software in the system while the old software continues to process calls;
- means for running a plurality of test calls through the system and routing all said test calls to the new software for processing thereby, without halting all actual telecommunications traffic to the old software including,
- means for routing only simulated calls to the new software for processing thereby, while all actual calls continue to be processed by the old software; and
- means for routing both simulated calls and a select number of new calls to the new software for processing thereby, in response to said simulated calls being successfully processed by the new software, while all remaining new calls continue to be processed by the old software;
- means for routing all of the new calls received by the system to the new software in response to the new software successfully processing said test calls; and
- means for removing the old software from the system in response to successful processing of all of the new calls by the new software, and a termination or transfer of all calls being processed by the old software.

95. A system for dynamically binding first and second modules respectively disposed in first and second software applications by providing a set of direction points for dynamically directing chains of events within the operational software system to either one or the other of said first and second applications, said system comprising:
- means for analyzing messages addressed by function name;
- means for directing those messages to processes in each of said first and second modules; and
- means for directing the execution of a process by dynamic runtime binding to continue the execution of said process in either of said first or second software modules.

* * * * *

UNITED STATES PATENT AND TRADEMARK OFFICE
CERTIFICATE OF CORRECTION

PATENT NO. : 5,410,703
DATED : Apr. 25, 1995
INVENTOR(S) : Nilsson et al.

It is certified that error appears in the above-indentified patent and that said Letters Patent is hereby corrected as shown below:

Column 25, line 46   Before "software"
Insert --old--

Column 30, line 10   Replace "firs"
With --first--

Column 30, line 11   Replace "completing"
With --completion--

Column 33, line 32   After "software"
Insert --wherein both existing data and new data are processed in a series of transactions and both include dynamic data which is created and used during the processing of each transaction and deleted when the processing is complete and semipermanent data which is used by and survives the processing of a plurality of transactions, said system--

Signed and Sealed this

Twenty-seventh Day of January, 1998

*Attest:*

BRUCE LEHMAN

*Attesting Officer*    *Commissioner of Patents and Trademarks*